US010620645B2

(12) United States Patent
Clark et al.

(10) Patent No.: US 10,620,645 B2
(45) Date of Patent: Apr. 14, 2020

(54) MICROZONE HVAC SYSTEM WITH PRECISION AIR DEVICE

(71) Applicant: Trane International Inc., Davidson, NC (US)

(72) Inventors: Taylor Ben Clark, La Crosse, WI (US); Princeton Lobo, Mangalore (IN); Scott A. Munns, Onalaska, WI (US); William B. Rockwood, Mindoro, WI (US); Franklin K. Rolles, Denver, NC (US); Kaustubh Phalak, La Crosse, WI (US)

(73) Assignee: Trane International Inc., Davidson, NC (US)

(*) Notice: Subject to any disclaimer, the term of this patent is extended or adjusted under 35 U.S.C. 154(b) by 126 days.

(21) Appl. No.: 15/667,981

(22) Filed: Aug. 3, 2017

(65) Prior Publication Data

US 2019/0041883 A1 Feb. 7, 2019

(51) Int. Cl.
*G05D 23/19* (2006.01)
*G06F 1/3231* (2019.01)
(Continued)

(52) U.S. Cl.
CPC .......... *G05D 23/1934* (2013.01); *F24F 11/30* (2018.01); *F24F 11/76* (2018.01); *G05D 23/1917* (2013.01); *G06F 1/3231* (2013.01); *H04L 12/2829* (2013.01); *F24F 2110/00* (2018.01)

(58) Field of Classification Search
CPC ............. G05D 23/193; G05D 23/1932; G05D 23/1934; F24F 11/74; F24F 11/76; F24F 11/77; F24F 2110/10; G06F 1/3231; H01L 12/2829; H04L 12/2829; B60H 1/00828; B60H 2001/0015
See application file for complete search history.

(56) References Cited

U.S. PATENT DOCUMENTS 4,860,642 A * 8/1989 Nussbaum ................ F24F 1/00
454/306
4,969,508 A 11/1990 Tate et al.
(Continued)

OTHER PUBLICATIONS

Trane International Inc., "Tracern™ Controls Tracer VV550/551 VAV Controllers", Literature Order No. CNT-PRC003-EN, Oct. 2005.
(Continued)

*Primary Examiner* — Marc E Norman
(74) *Attorney, Agent, or Firm* — The Salerno Law Firm, P.C.

(57) ABSTRACT

Systems, apparatus and methods for providing personalized comfort to occupants of a conditioned space. A precision air device having a standalone controllable fan with directional nozzles is provided. The precision air device includes environmental and occupancy sensors, and communicates with a user device and with other precision air devices in the space. Application software installed on an occupant's user device enables the occupant to specify whether it is too cold or too warm within his or her personal space, or microzone. The collective demand of all microzones within a VAV macrozone is determined by a precision air aggregator to adjust a controllable VAV damper for that macrozone.

21 Claims, 26 Drawing Sheets

(51) Int. Cl.
*H04L 12/28* (2006.01)
*F24F 11/30* (2018.01)
*F24F 11/76* (2018.01)
*F24F 110/00* (2018.01)

(56) References Cited

U.S. PATENT DOCUMENTS

| | | | |
|---|---|---|---|
| 5,119,987 A | 6/1992 | Kobayashi | |
| 5,135,436 A | 8/1992 | Levy et al. | |
| 5,238,452 A | 8/1993 | Levy et al. | |
| 5,358,444 A | 10/1994 | Helm et al. | |
| 5,364,304 A | 11/1994 | Hampton | |
| 5,403,232 A | 4/1995 | Helm et al. | |
| 5,499,504 A | 3/1996 | Mill et al. | |
| 6,079,626 A | 6/2000 | Hartman | |
| 6,250,560 B1 | 6/2001 | Kline et al. | |
| 6,318,113 B1 * | 11/2001 | Levy | F24F 3/044 454/306 |
| 6,481,228 B1 | 11/2002 | Chiang et al. | |
| 7,168,627 B2 | 1/2007 | Kates | |
| 7,347,774 B2 | 3/2008 | Aronstam et al. | |
| 7,483,964 B1 | 1/2009 | Jackson et al. | |
| 7,904,209 B2 | 3/2011 | Podgomy et al. | |
| 8,249,731 B2 | 8/2012 | Tran et al. | |
| 8,550,370 B2 | 10/2013 | Barrett et al. | |
| 8,695,888 B2 | 4/2014 | Kates | |
| 9,152,154 B2 | 10/2015 | Gupta et al. | |
| 2002/0134849 A1 | 9/2002 | Disser | |
| 2006/0254293 A1 | 11/2006 | Lee et al. | |
| 2007/0125111 A1 | 6/2007 | Xiao | |
| 2007/0138307 A1 | 6/2007 | Khoo | |
| 2008/0277486 A1 | 11/2008 | Seem et al. | |
| 2010/0204807 A1 | 8/2010 | Isaacson | |
| 2011/0295430 A1 | 12/2011 | Kouninski | |
| 2012/0031984 A1 | 2/2012 | Feldmeier et al. | |
| 2012/0158203 A1 | 6/2012 | Feldstein | |
| 2013/0048263 A1 | 2/2013 | Nouvel et al. | |
| 2014/0191848 A1 | 7/2014 | Imes et al. | |
| 2014/0277765 A1 | 9/2014 | Karimi et al. | |
| 2014/0358291 A1 | 12/2014 | Wells | |
| 2015/0247646 A1 | 9/2015 | Song et al. | |
| 2016/0047568 A1 * | 2/2016 | Chan | G05B 19/042 62/56 |
| 2016/0131391 A1 | 5/2016 | He et al. | |

OTHER PUBLICATIONS

Trane International Inc., Facts about Trane Air-Fi Wireless Technology, Jan. 12, 2015.

Matt Hillman, An Overview of ZigBee Networks, MWR InfoSecurity, Feb. 4, 2015.

* cited by examiner

Where:
($f^{-1}$) is the inverse function of the (learning) curves derived from Fuzzy logic.
Dynamic variables: values from sensors,
Parameters: User entered values from the user Application.

MICROZONE HVAC SYSTEM WITH PRECISION AIR DEVICE

BACKGROUND

1. Technical Field

The present disclosure relates generally to heating, ventilation, and air conditioning (HVAC) systems, and in particular, to systems, apparatus, and methods that provide personally controllable air delivery to individuals situated in an environmentally controlled space, such an office cubicle environment.

2. Background of Related Art

A building automation system (BAS) is a system of controls and devices for managing the environment of a building. A BAS may include one or more building automation controllers (BAC) in communication with such devices as HVAC components, lighting devices, security and access control devices, irrigation systems, BAS command and control consoles, and so forth.

In a typical HVAC system, conditioned air is delivered from an air source, such as an air handler or rooftop unit, to an office space by a ceiling-mounted device known as a variable air volume (VAV) box. The VAV box includes a damper that regulates the flow of air passing through the VAV, and outlet ports through which the conditioned air flows into ducts or flex tubes to one or more diffusers that supply the air to the space. The diffusers can contain a grille, directing vanes, or other structures that direct the conditioned air into the space. The temperature of the conditioned air delivered by the air source to the VAV, and the position of the VAV damper, may be determined by operating commands issued by the BAC.

One drawback of current approaches to office building air delivery is that often no provision is made to accommodate individual comfort preferences of each cubicle's occupant. Known thermal comfort models assume that an individual's comfort is a fixed value or a value within a range. Another drawback is that air is delivered to areas which may be either unoccupied or which, because of occupant discomfort, require less airflow. These drawbacks make it impossible to fully optimize air delivery throughout the environment and achieve maximum efficiency of the HVAC system. They also make unavoidable varying degrees of occupant discomfort, and the associated loss of productivity. An HVAC system that addresses these shortcomings in a user-friendly and cost-effective manner would be a welcome advance in the art.

SUMMARY

In one aspect, the present disclosure is directed to a precision air device having a housing, an air intake, an outlet nozzle, a nozzle damper operatively associated with the outlet nozzle, an air mover configured to move air from the air intake to the outlet nozzle, and an air sensor. The precision air device includes a controller having a processor in operative communication with the air mover and the air sensor, a communications interface coupled to the processor, and a memory coupled to the processor. The memory includes instructions, which, when executed by the processor, cause the controller to verify the presence of an occupant, determine a target air velocity, and adjust the nozzle damper and/or the air mover to deliver the determined air velocity from the outlet nozzle.

In some embodiments, the precision air device includes an actuator coupled to the nozzle damper. The actuator is in operative communication with the processor and is configured to adjust the position of the nozzle damper. The precision air device may include an occupancy sensor in operative communication with the processor. The air sensor can include a temperature sensor and/or a relative humidity sensor. The air mover may, in some embodiments, include a centrifugal impeller and a variable speed motor operatively coupled to the centrifugal impeller. The air mover may be fixed to the base with one or more isolation members. In some embodiments, the precision air device includes a vane structure disposed between the air intake and the air mover and having a series of vanes extending downwardly therefrom dimensioned to engage an inner surface of the housing and configured to direct air from the air mover to the outlet nozzle.

In another aspect, the present disclosure is directed to a microzone HVAC system. The microzone HVAC system includes a variable air volume box configured to deliver conditioned air to a zone, one or more precision air devices, and a precision air aggregator in operative communication with the one or more precision air devices and the variable air volume box.

In some embodiments, the microzone HVAC system includes application software configured for execution on a user device to enable a user to communicate a comfort parameter to the microzone HVAC system. In some embodiments, the application software is further configured to pair the user device to a specific one of the one or more precision air devices. The comfort parameter may include a fan speed, a clothing characterization, and a metabolic characterization. The precision air aggregator may be communicatively coupled with the one or more precision air devices by a wireless mesh network. In some embodiments, the microzone HVAC system includes the precision air device as described above. In some embodiments, the precision air aggregator comprises a comfort index log, a processor, a communications interface coupled to the processor, and a memory coupled to the processor storing instructions, which, when executed by the processor, cause the controller to receive a comfort index from a precision air device and enter the received comfort index into the a comfort index log if the received comfort index differs from the previous comfort index by a predetermined amount.

In yet another aspect of the present disclosure, a method of operating a microzone HVAC system includes associating a precision air device to a microzone within a climate control macrozone, pairing a user device with the precision air device, cooling the macrozone to a first setpoint temperature, sensing an occupancy of the microzone, receiving, at the precision air device, a user comfort parameter from the user device, and adjusting an air velocity of the precision air device in accordance with the received user comfort parameter to attempt to achieve a perceived temperature at the microzone that is different from the first setpoint temperature.

In some embodiments, the method includes cooling the macrozone to a second setpoint temperature that is different than the first setpoint temperature if the perceived temperature is not achieved. In some embodiments, the method may include defining an initial comfort index of a user, obtaining a macrozone temperature, a microzone temperature, a current air velocity of the precision air device, a user clothing characterization, and a user metabolic characterization, receiving an air velocity adjustment amount from the user, and updating the comfort index of the user based on the air velocity adjustment. The macrozones may include a plurality of microzones. The method can include cooling the macrozone to a second setpoint temperature that is lower than the first setpoint temperature if the number of microzones where the current air velocity is greater than a predetermined threshold exceeds a predetermined percentage of the total number of microzones, or the total number of occupied microzones. An updated user clothing characterization and/or an updated user metabolic characterization can be solicited from the user if the microzone temperature exceeds the macrozone temperature. In some embodiments, the method can include increasing the macrozone temperature to a second setpoint temperature that is greater than the first setpoint temperature if the number of microzones where the current air velocity is less than a predetermined threshold exceeds a predetermined percentage of the total number of microzones, or the total number of occupied microzones.

BRIEF DESCRIPTION OF THE DRAWINGS

Various embodiments of the disclosed system and method are described herein with reference to the drawings wherein.

Figure 1:
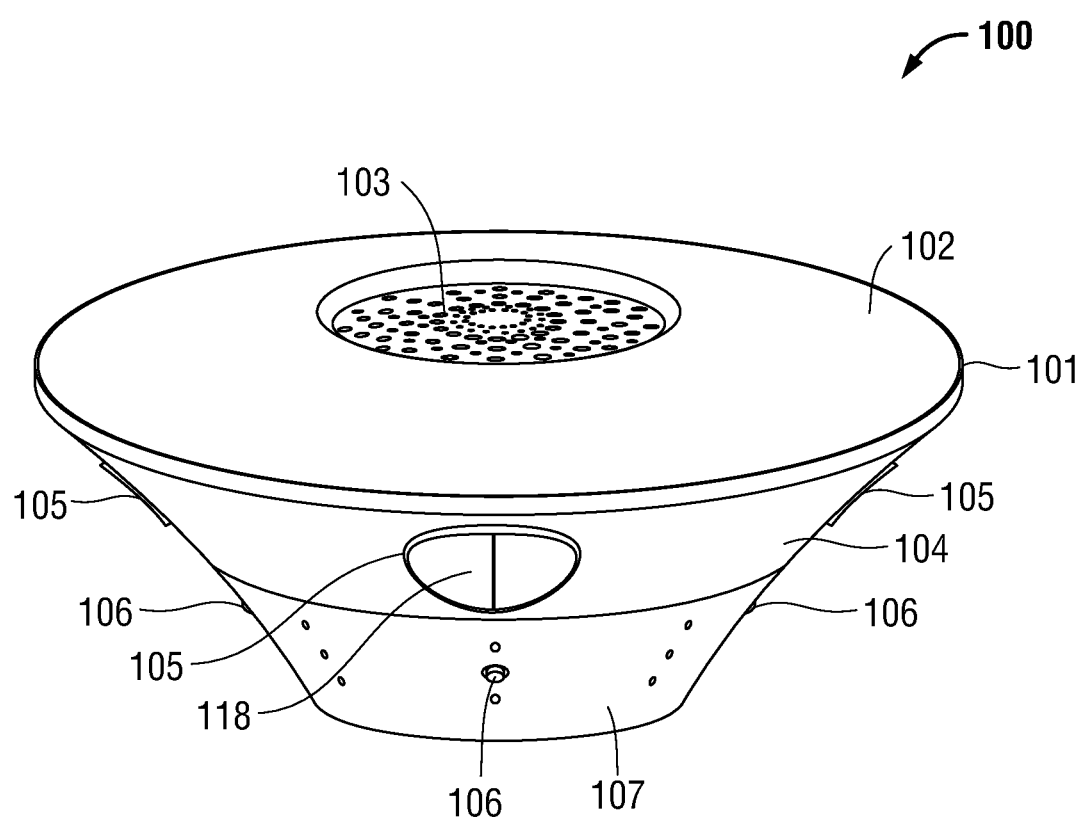
FIG. 1 is a perspective view of a precision air device in accordance with an exemplary embodiment of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but as a basis for the claims and examples for teaching one skilled in the art to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. One skilled in the art will also appreciate that, for security reasons, any element of the present disclosure may includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

In one aspect of the present disclosure, a precision air device having a standalone controllable fan with directional ducted nozzles is installed at each cubicle or station in an office environment. While the term "cubicle" is used throughout this disclosure to denote an area served by a ducted nozzle, it should be understood that a ducted nozzle may serve any area in which a user is present. The system enables an occupant to specify whether it is too cold or too warm within the cubicle using, for example, application software (an "app") installed on the occupant's user device; a desktop or laptop software application; a wall-mounted touchscreen, display or control panel; using a button or fingerprint sensor on the precision air device; using voice activation speech recognition via a microphone on the precision air device; and/or a remote control.

The term "microzone" is used to denote the local environment of a precision air device. The collective demand specified by all microzones within a VAV zone, or macrozone, is determined by a precision air aggregator (PAA). The PAA computes a modified zone temperature measurement and/or zone temperature setpoint and communicates instructions to the VAV controller, which modulates the VAV damper accordingly to achieve the required zone temperature as described in detail below. In an embodiment, the PAA may directly control or override the VAV controller airflow target value or damper position. The presence or absence of a user ("occupancy") at a cubicle may be determined using an occupancy sensor associated with the ducted nozzle (such as a passive infrared "PIR" sensor), by detecting an electronic signal associated with the user or a user's device (such as a Bluetooth™ signal from the user's mobile phone), from video analytics derived from a surveillance camera, detecting a user login at a computing device in the cubicle, and so forth. Airflow is turned off for unoccupied cubicles. The system continuously monitors user preferences (e.g., temperature adjustments up or down) communicated from a control panel or user software application, occupancy sensor status, and intake sensor readings to optimize the setpoints of all cubicle nozzles.

The inventors have recognized that, while modest efficiency gains may be realized by raising the macrozone (VAV zone) air temperature setpoint, or by reducing VAV airflow, much greater total gains may be realized by both raising the zone air temperature setpoint and reducing VAV airflow. The inventors have also recognized that increased local air velocity creates a perceived reduction in local temperature. The inventors have further recognized that there is an upper limit to local air velocity that both the user and local environment can accept without discomfort or disruption to the local space. The present invention is therefore designed to provide efficient local cooling while maintaining local airflow speeds below that which cause discomfort or annoyance. For example, a 200 ft/min air stream provides a perceived cooling of about 6° F., without causing a disruptive sensation of air flow. By selectively providing increased airflow to personal microzones, embodiments of the present disclosure enable the overall building setpoint temperature to be increased and total airflow to be reduced, while providing personalized and enhanced comfort to occupants and a net energy savings for the entire building.

In another aspect of the present disclosure, a user's preference history is used to compile a user profile that may be used, for example, to predict future energy use based on historical patterns or as an office-planning aid whereby users who have similar preferences can be grouped together. For example, during an office reconfiguration, users who have a history of preferring cooler temperatures are situated together, and likewise for those users preferring warmer temperatures. In another example, when a user moves to a new location, the environmental profile enables the system at the new location to adjust the user's environment according to the user's preference history. In an embodiment, a user profile is maintained in one or more remote data servers and may be applied when, for example, a user visits another room in the same building, moves to another building within the same organization, or travels to a site which also includes a BAS in accordance with the present disclosure.

In yet another aspect, disclosed is an air distribution system consisting of interlocking ceiling tiles that incorporate flat panel ducts to selectively distribute conditioned air to a targeted comfort zone. In still another aspect, the present disclosure is directed to an air distribution system consisting of an outlet of a VAV box coupled to a remotely-controlled diffuser to selectively distribute conditioned air to a targeted microzone.

In yet another aspect, an outlet of a VAV box is coupled to an inlet of a precision air device via a duct or other form of air conduit. The precision air device may be mounted overhead, such as on a ceiling over an associated microzone, to deliver personalized air streams to cubicles within the microzone.

Figure 2:
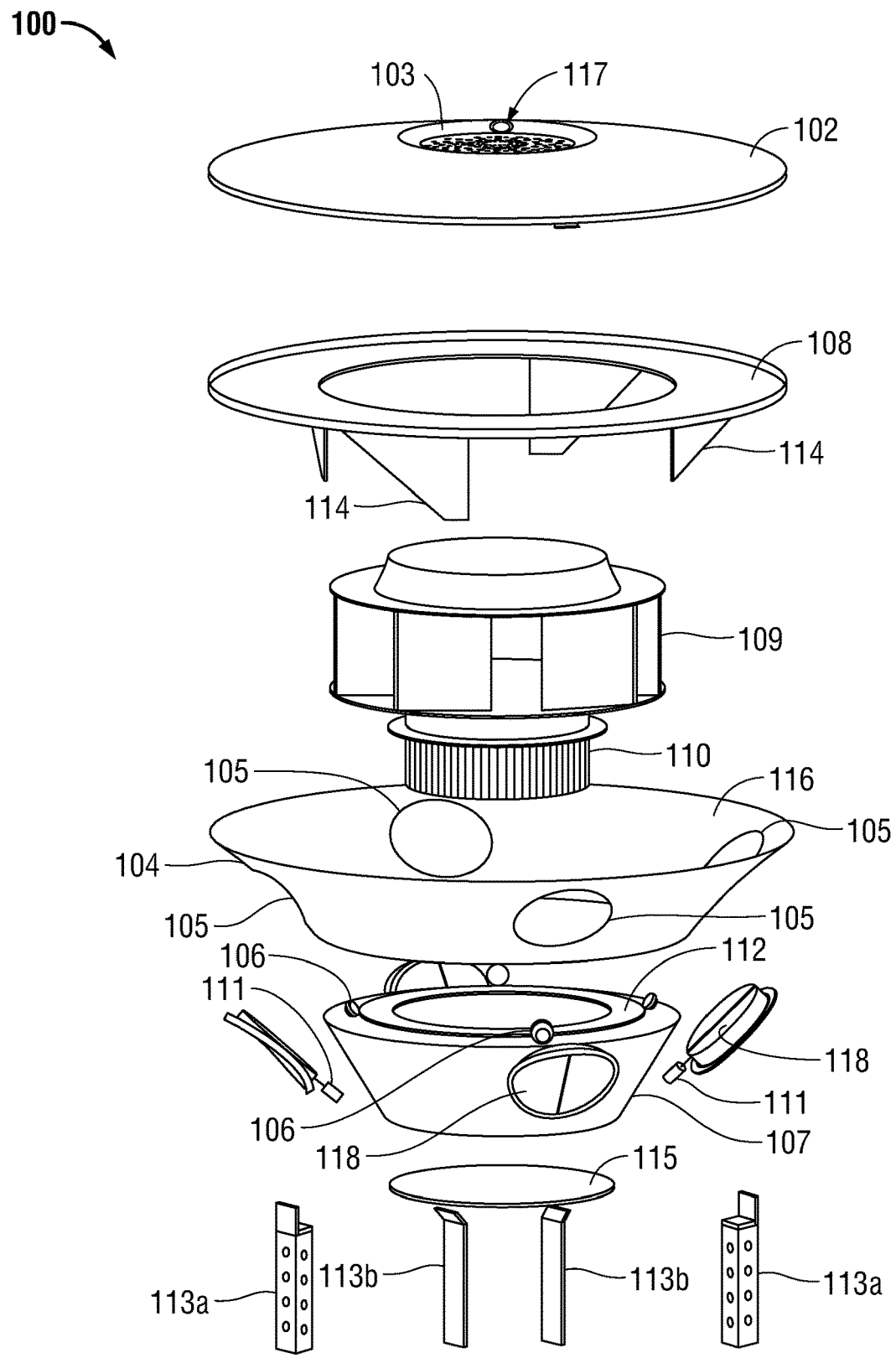
FIG. 2 is an exploded view of the precision air device of FIG. 1.

FIGS. 1 and 2 illustrate a precision air device 100 in accordance with an exemplary embodiment of the present disclosure. Precision air device 100 includes a housing 101 having a disc-shaped top cover 102 and a body 104 having a generally tapered cylindrical shape. Cover 102 includes an intake 103 into which room air is drawn into precision air device 100 during operation. An intake sensor 117 is disposed proximate to intake 103 and is configured to sense the conditions of ambient air being drawn into precision air device 100. In the present embodiment, intake sensor 117 includes a combination temperature/relative humidity sensor. Housing 101 includes four outlet nozzles 105 from which air is expelled to provide enhanced comfort to a user. An occupancy sensor 106 is mounted proximate to each outlet nozzle 105 that is configured to sense the presence of a person within the area that receives airflow from the corresponding outlet nozzle 105. With reference to FIG. 2, precision air device 100 includes a base 107 having a bottom cover 115 that is configured to accept a variety of mounting adapters, such as angular mounting plate 113a and surface mounting plate 113b to facilitate the use of precision air device 100 in a range of mounting situations.

With continued reference to FIG. 2, precision air device 100 includes a centrifugal impeller 109 driven by a motor 110, which in the present embodiment is an electrically commutated motor (ECM), sometimes referred to as a brushless DC motor, but may, in other embodiments, be a fixed speed DC motor or a fixed or variable speed AC motor. Preferably, motor 110 is rated for continuous operation and includes maintenance-free ball bearings for quiet operation and long service life. Centrifugal impeller 109 may be formed from any suitable material, such as, without limitation, polypropylene (PP). Motor 110 may be fixed to base 107 and/or bottom cover 115 using any suitable fastener, such as bolts, rivets, and the like, and may include isolation members to reduce operating noise and vibration. A vane structure 108 is disposed between intake grille 102 and impeller 109 and includes a series of vanes 114 extending downwardly therefrom that are dimensioned to engage an inner surface 116 of body 104 to direct air from impeller 109 to each of the outlet nozzles 105.

Figure 3:
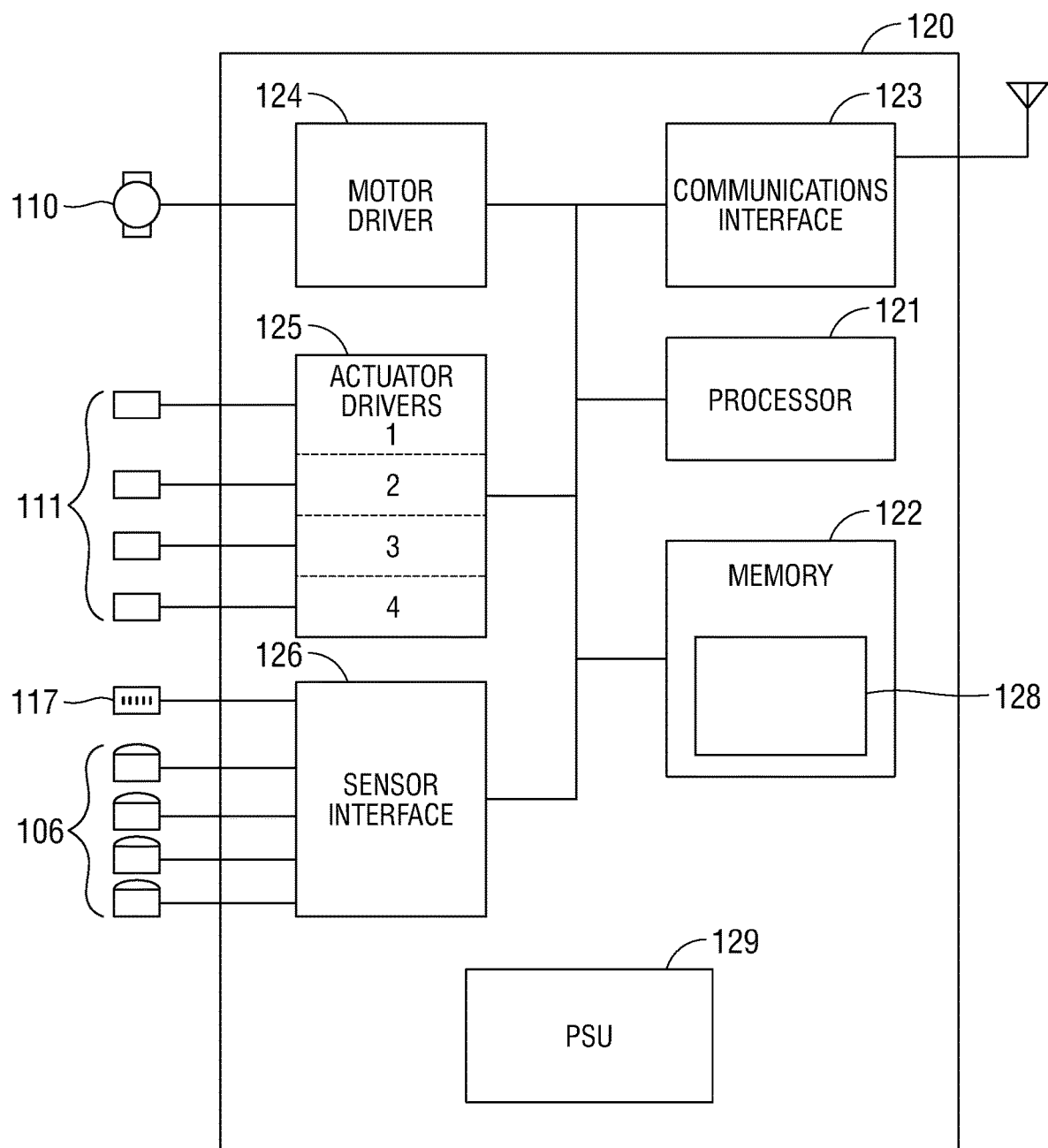
FIG. 3 is a block diagram of a precision air device controller in accordance with an embodiment of the present disclosure.

Each outlet nozzle 105 is operatively associated with a corresponding nozzle damper 118. An actuator 111 is coupled to nozzle damper 118 to adjust the position of damper 118 to control the airflow through the corresponding outlet nozzle 105. A printed circuit board (PCB) 112 is mounted in base 107. PCB 112 includes components required to operate precision air device 100. FIG. 3 illustrates an embodiment of a controller 120 included on PCB 112. Controller 120 includes a processor 121 operatively coupled with a memory 122. Memory 122 may include volatile and non-volatile memory, such as RAM, ROM, EEPROM, flash memory, optical, or magnetic disk memory, in any desired form factor, such as dual inline package (DIP), surface mount device (SMD), SD card, USB stick, hard drive, solid state drive (SSD) and so forth. A communications interface 123 is operatively coupled to processor 121 and supports a wireless networking protocol based on the IEEE 802.15.4 personal area networking standard (e.g., Zigbee®, Trane Air-Fi®, Z-Wave®). Other embodiments may additionally, optionally, or alternatively support other wireless communications protocols, such as, without limitation, IEEE 802.11 "WiFi" wireless networking standard, Bluetooth, Bluetooth Low Energy (BLE), and so forth. Still other embodiments may additionally, optionally, or alternatively support a wired communication protocol, such as TCP/IP over Ethernet.

Controller 120 includes motor driver 124 that includes circuitry for driving motor 110 at a desired speed. In an embodiment where motor 110 is a variable speed DC motor, motor driver 124 includes pulse width modulation (PWM) circuitry for driving motor 110 at variable speed as will be familiar to the skilled artisan. In use, motor driver 100 receives a motor drive signal from processor 121 to run motor 110 and thus impeller 109 at an appropriate speed to deliver the desired airflow to an occupant. Motor driver 124 may be configured to change the speed of motor 110 at a predefined, gradual rate to render the operation of precision air device 100 less obtrusive to an occupant.

In some embodiments, motor driver 124 may be included in motor 110. In these embodiments, controller 120 communicates a fan control signal to motor driver 124 of motor 100 to vary the speed of motor 110. The fan control signal may be an analog voltage or input current that corresponds to the desired speed, a PWM speed command, or a communicated value using a proprietary or standard network protocol including, but not limited to, MODBUS, I2C, or 1-Wire.

Controller 120 includes a set of actuator drivers 125 which interface control signals from processor 121 to each of the actuators 111 during use. Each outlet nozzle 105 is operatively associated with a corresponding actuator 111 that is configured to adjust the position of a nozzle damper 118 that adjusts the volume of air flowing through outlet nozzle 105. While in the example embodiment depicted in FIGS. 1-3, actuator 111 includes a stepper motor configured to adjust nozzle damper 118, the present disclosure is not so limited and in various embodiments, actuator 111 may include a servo motor, a pneumatic actuator, a wax motor, or other suitable motive device. Actuator 111 may be coupled to nozzle damper 118 in any suitable manner, such as direct drive, gear drive, rack and pinion drive, belt drive, roller (friction) drive, and so forth. Controller 120 includes sensor interface 126 which communicatively couples intake sensors 117 and occupancy sensors 106 to processor 121. A power supply unit (PSU) 129 converts AC line voltage, typically 100-240 VAC at 50 or 60 Hz, to low voltage DC suitable for use by controller 120, e.g., 3.3 VDC, 5 VDC, 12 VDC and/or 24 VDC. PSU 129 may be included in controller 120 (e.g., on PCB 112) or may be provided as an external power supply unit (e.g., a "power brick").

Controller 120 includes supervisor module 128 that is configured to cause controller 120 adjust the speed of motor 110 and/or the positions of actuators 111 in response to commands received from a remote device via communications interface 123, and to cause controller 120 to transmit sensor readings obtained from intake sensor 117 and/or one or more occupancy sensors 106 to a remote device via communications interface 123. Supervisor module 128 may be embodied as any suitable software and/or hardware as will be appreciated by those having skill in the art and/or as described herein, for example, as a set of program instructions stored in memory 122 and executable by processor 121. Supervisor module 128 may additionally or alternatively be configured to adjust the speed of motor 110 and/or the positions of actuators 111 based at least in part upon sensor readings of intake sensor 117 and/or one or more of occupancy sensors 106.

It should be understood that, although the present example embodiment is configured to accommodate four users (e.g., includes four outlet nozzles 105, four vanes 114, four sensors 106, four dampers 118, four actuators 111 etc.), the present disclosure is not so limited. Embodiments of a precision air device 100 according to the present disclosure may include any number of outlet nozzles 105, vanes 114, sensors 106, dampers 118, actuators 111 etc.

Figure 4:
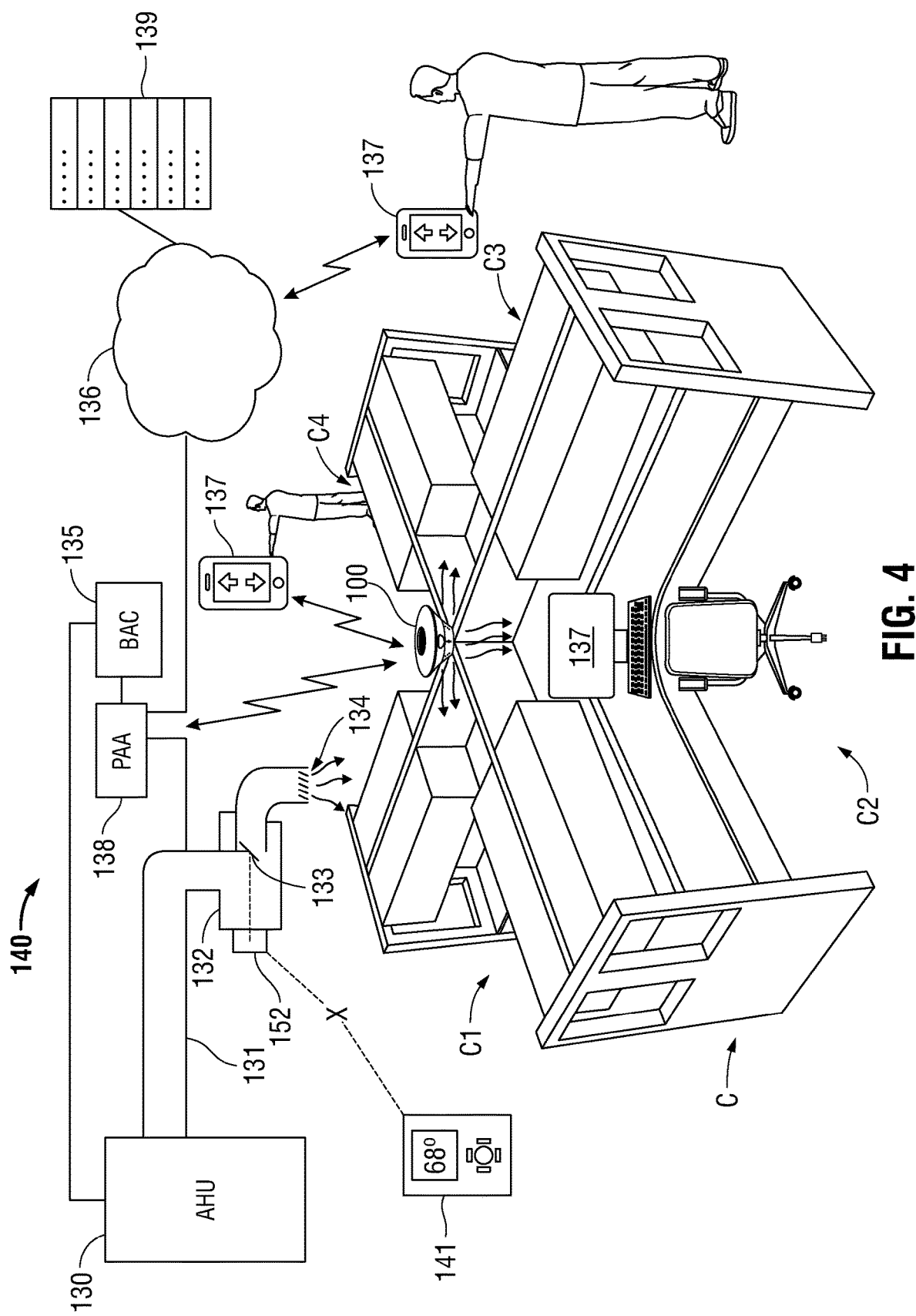
FIG. 4 is a diagram of a microzone HVAC system utilizing a precision air device in accordance with an exemplary embodiment of the present disclosure.
Figure 4A:
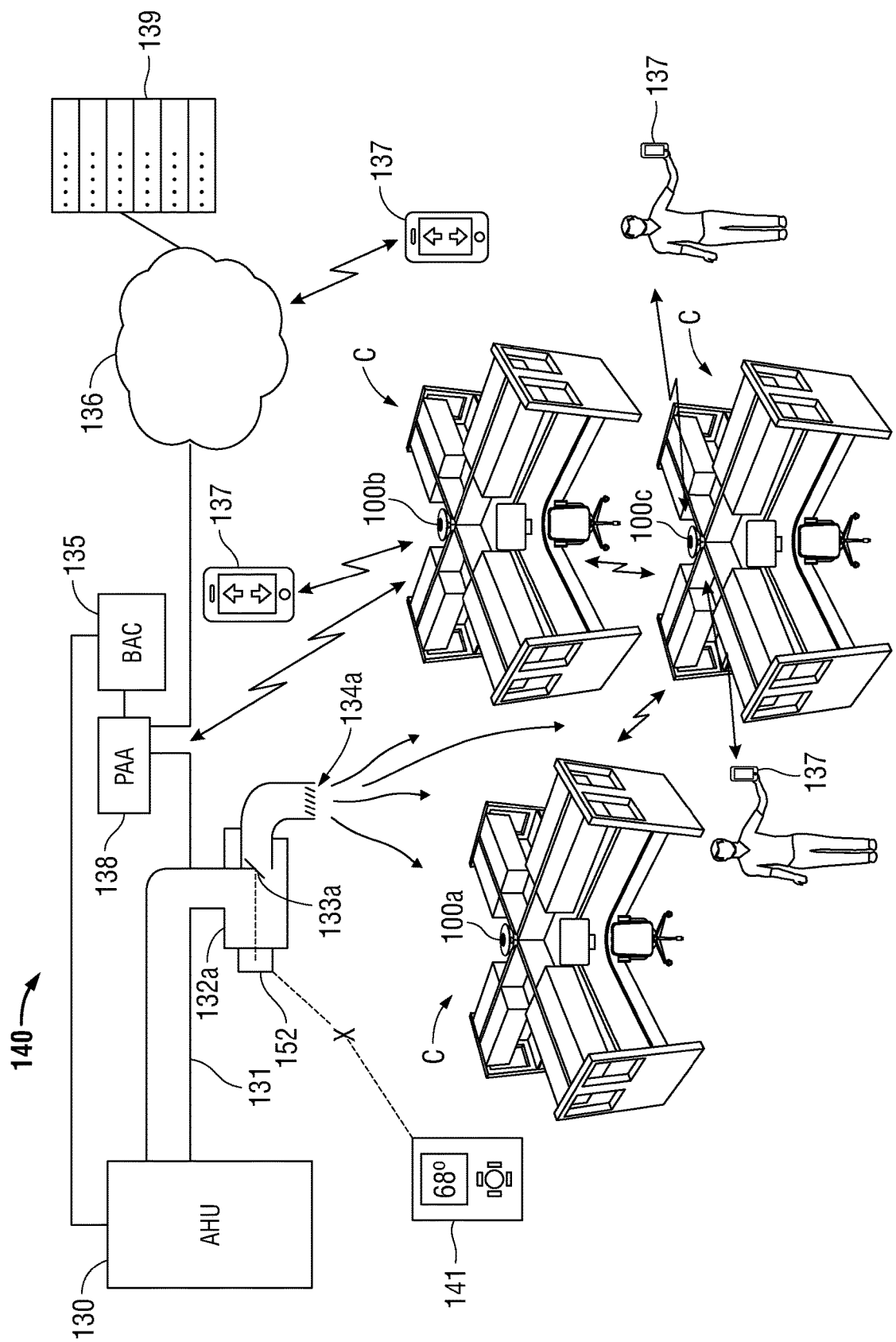
FIG. 4A is a diagram of a microzone HVAC system utilizing precision air devices in accordance with another exemplary embodiment of the present disclosure.

FIG. 4 depicts a personal comfort HVAC system 140 that utilizes one or more precision air devices 100 to provide personalized comfort to occupants of an office cubicle system C that is situated in a conditioned space. Example cubicle C is partitioned into work station C1, C2 etc. Precision air device 100 is mounted to cubicle C and oriented such that each outlet nozzle 105 is directed towards a seating position of each work station C1, C2 etc. Conditioned air flows from VAV box 132 via duct 131 into the conditioned space through one or more diffusers 134 positioned on the ceiling of the conditioned space in proximity to cubicle C. VAV box 132 includes a damper 133 that controls the airflow from VAV box 132, through the ceiling-mounted diffuser 134, and into the conditioned space. System 140 associates a group of one or more precision air devices 100 (a fan group) with a common VAV box 132 and/or damper 133 which provides conditioned air to the fan group. In the example embodiment shown in FIG. 4A, a single VAV box 132a supplies conditioned air to three cubicle units C via a single diffuser 134a. In this example, each of precision air devices 100a, 100b, and 100c are associated with VAV box 132a and damper 133a. In certain embodiments, VAV box 132 may include a plurality of dampers 133, each controlling the flow of conditioned air to a separate air diffuser 134 located in proximity to a defined set of one or more office cubicles. Each precision air device 100 is associated with one or more VAV boxes 132 which supply conditioned air to the vicinity in which precision air device 100 is located.

HVAC system 140 includes a building automation system controller (BAC) 135 configured for operative communication with one or more air handler units 130, one or more VAV boxes 132, one or more environmental sensors 149, and/or one or thermostats 141. BAC 135, VAV boxes 132, and thermostats 141 may utilize any suitable combination of wired and/or wireless communication links, such as, without limitation, a wired RS-485 differential twisted pair network utilizing the BACnet protocol, a wireless network based on the IEEE 802.11 standards (e.g., "WiFi"), a LonWorks® network, a proprietary interconnection scheme, and/or a wireless mesh network based on the IEEE 802.15.4 standards (e.g., Zigbee, Trane AirFi®). Environmental sensors 149 may include, without limitation, a temperature sensor, a relative humidity sensor, a barometric pressure sensor, an air flow sensor, an occupancy sensor, and/or a $CO_2$ sensor. Environmental sensors 149 may be positioned within the conditioned space and/or outdoors to assess ambient weather conditions.

For example, in some embodiments, BAC 135 adjusts the operation of air handler unit 130 and VAV boxes 132 via a BACnet network to maintain the conditioned space at a desired setpoint temperature in response to inputs received from one or more thermostats 141. In certain other embodiments, thermostat 141 is hard-wired to an associated VAV box 132 to provide localized control of conditioned air into the space, without necessarily interacting with BAC 135. In these embodiments thermostat 141 adjusts the position of the VAV damper 133 of the associated VAV box 132 to regulate the volume of airflow into the space, which, in turn, maintains the temperature of the conditioned space at the desired setpoint. VAV box 132 includes a hard-wired thermostat override which enables a precision air aggregator (PAA) 138 to assume control of VAV box 132 when required, as described in more detail below.

In other example embodiments, BAC 135 provides high-level supervisory control and data aggregation of the entire HVAC system. Air handler unit 130 regulates the air flow and air temperature supplied to VAV boxes 132. VAV box 132 includes a VAV controller 152 that adjusts the position of VAV damper 133 position to maintain VAV zone (macrozone) air temperature at the desired zone temperature setpoint. Thermostat 141 measures the average macrozone temperature and allows a user to enter a desired zone temperature setpoint that is communicated to VAV controller 152, which, in turn, adjusts the position of VAV damper 133 to control macrozone temperature. VAV controller 152 may include a temperature setpoint override function to enable PAA 138 to override thermostat 141. Additionally or alternatively, PAA 138 can masquerade as thermostat 141 by providing the same electrical signals that thermostat 141 would normally provide. In this case, thermostat 141 is deactivated.

Precision air aggregator (PAA) 138 can act as a gateway between precision air devices 100 and the other elements of microzone HVAC system 140. With attention now to the example embodiment shown in FIG. 5, the one or more precision air devices 100 form a wireless mesh network 142 utilizing the Zigbee networking protocol. In embodiments, mesh network 142 operates in conformance with a Zigbee® "Building Automation Certified" protocol using an open BACnet™ standard, also known in the art as Trane Air-Fi®. PAA 138 may function within mesh network 142 as a coordinator (parent) node, a router node, or an end node. When operating as an end node, PAA 138 may be configured to disable sleep mode (e.g., a low power, battery-saving mode).

PAA 138 is communicatively coupled with a remote server 139 that receives temperature preferences and related profile information from users who occupy a work station situated in the conditioned space. Remote server 139 includes a database storing relationships or "bindings" between a user and a precision air device 100 at the user's workstation; which outlet nozzle 105 of the precision air device 100 faces the user's work station; and user historical data such as temperature preference history (e.g., whether the user typically prefers warmer or cooler temperatures) and location history (e.g., those work stations with which the user has been associated).

A binding between a user and a precision air device 100 can be established using a number of techniques. In one embodiment, a user device 137 is configured with application software 151 that enables a user to communicate with microzone HVAC system 140. A user enters into user device 137 a choice of outlet nozzle 105 facing his or her work station, and a unique fan identification (Fan ID) code found on a label affixed to precision air device 100. The outlet nozzle choice, Fan ID and a unique code associated with the user device is transmitted to remote server 139 to establish the binding. A unique code associated with the user device may include an electronic serial number (ESN), an international mobile equipment identity code (IMEI), a media access control address (MAC address), a user name, email address, a phone number (e.g., mobile identification number or MIN), or other suitable indicia that identifies the user or a device in possession of the user. In another embodiment, the Fan ID is obtained by scanning a barcode or QR code fixed to precision air device 100 using a camera included in user device 137, which is transmitted with the user device ID to remote server 139 to establish the binding. In yet other embodiments, user device 137 and precision air device 100 are paired via a Bluetooth® connection. In these embodiments, precision air device 100 includes a pairing pushbutton (or similar actuator) adjacent to, or otherwise associated with, each outlet nozzle 105. The user activates the pairing button of the desired outlet nozzle, and completes the pairing process with his or her user device 137 to establish a Bluetooth connection. Using this Bluetooth connection, precision air device 100 transmits the Fan ID and outlet nozzle identifier to user device 137, which, in turn, transmits the Fan ID, outlet nozzle identifier, and user device identifier to remote server 139.

User device 137 may include, but is not limited to, a smart phone or tablet computer, a desktop or laptop computer, a wall-mounted touchscreen, a display or control panel, and/or a remote control.

A binding between a PAA 138, a precision air device 100, and/or a VAV 132 may be established to enable communications therebetween, and to create functional groupings consisting of a VAV 132 and one or more precision air devices 100. In one embodiment, such a binding can be achieved by actuating, within a predefined time period, a pairing button on each device to be bound. In another embodiment, binding is achieved by manipulating a set of rotary dials, DIP switches, header pin jumpers, etc. to enter a common code identifying the bound devices to each other. In still another embodiment, a unique device identifier, such as a MAC address, is used.

The system enables user device 137 to communicate with precision air devices 100 and/or remote server 139 using a variety of methods which may be dynamically chosen based, at least in part, on user preferences, site provisioning, and/or the local radiofrequency (RF) environment. Thus, if a cellular network 145 or WiFi network 146 is available, user device 137 may communicate with precision air devices 100 and/or remote server 139 using the available cellular or WiFi network. Alternatively, user device 137 may utilize a Bluetooth® connection to communicate with precision air devices 100 and/or remote server 139 via mesh network 142 and PAA 138.

Figure 5:
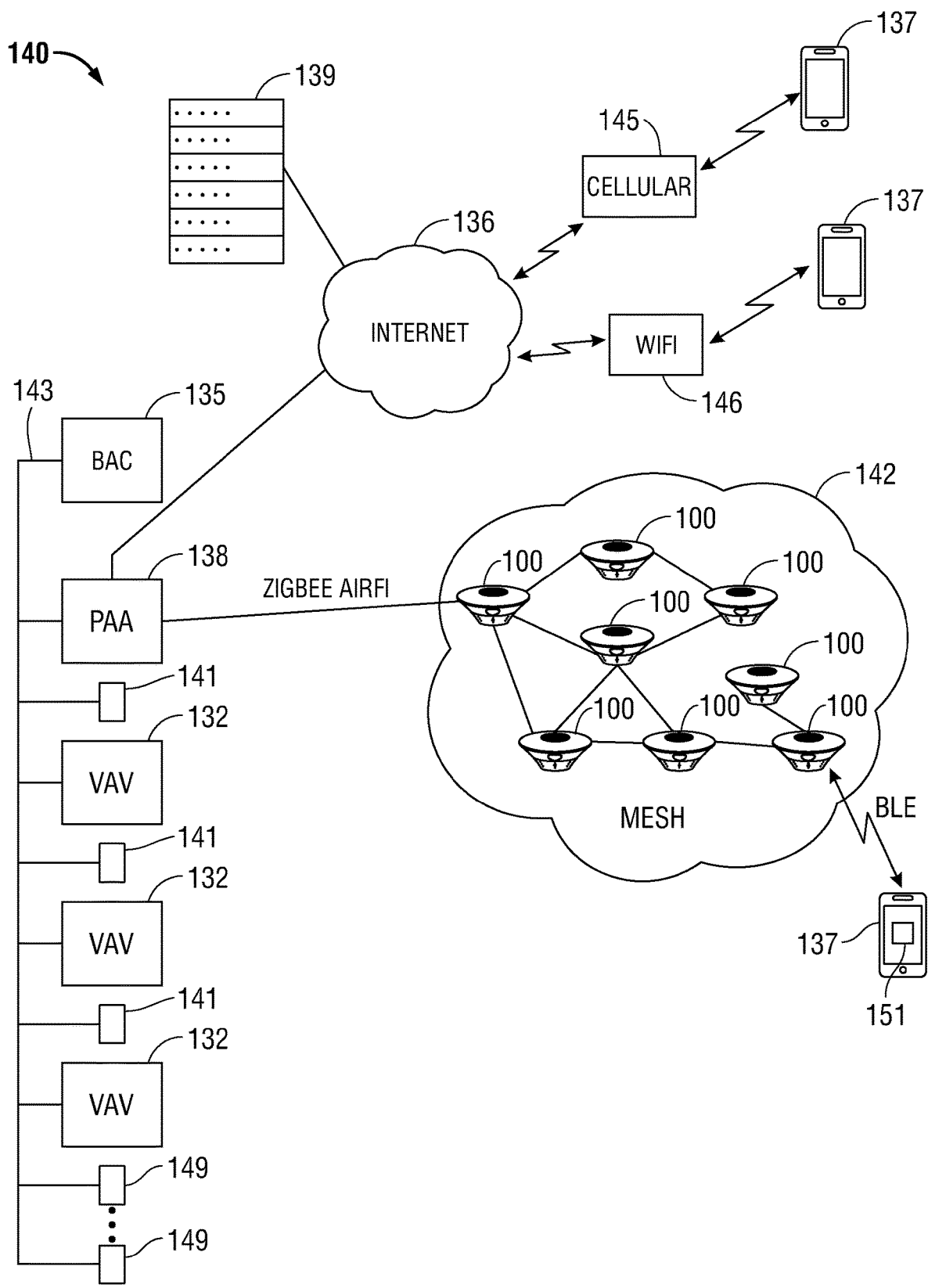
FIG. 5 is schematic diagram of a microzone HVAC system having a precision air aggregator in a network configuration according to an exemplary embodiment of the present disclosure.

Advantageously, the disclosed personalized comfort system may be flexibly configured to integrate into a wide range existing HVAC systems as an upgrade or retro-fit. FIG. 5 illustrates one such configuration where a personalized comfort HVAC system 140 in which a PAA 138 is communicatively coupled thereto via a BACnet network 143. During operation, BAC 135 communicates with thermostats 141 and VAV boxes 132 to control the flow of conditioned air to maintain the conditioned space at a predetermined setpoint. In the event a precision air device adjustment or macrozone temperature adjustment is required in response to a change in an occupant preference, remote server 139 transmits a message to PAA 138 that indicates the type of change desired (e.g., adjust the setpoint or precision air device nozzle airflow), which precision air device 100 is associated with the requested change, and, optionally, which VAV box 132 is associated with the indicated precision air device 100. In turn, PAA 138 transmits a message to the indicated precision air device 100 via mesh network 142 to increase or decrease airflow toward the occupant. This can be achieved by increasing or decreasing the impeller speed accordingly and/or by adjusting the position of damper 118 of the appropriate outlet nozzle 105. Optionally or alternatively, PAA 138 transmits, via BACnet 143, a message to BAC 135 and/or to the VAV 132 associated with the indicated precision air device 100 to adjust the flow of conditioned air to the vicinity in which indicated precision air device 100 is situated.

Figure 6:
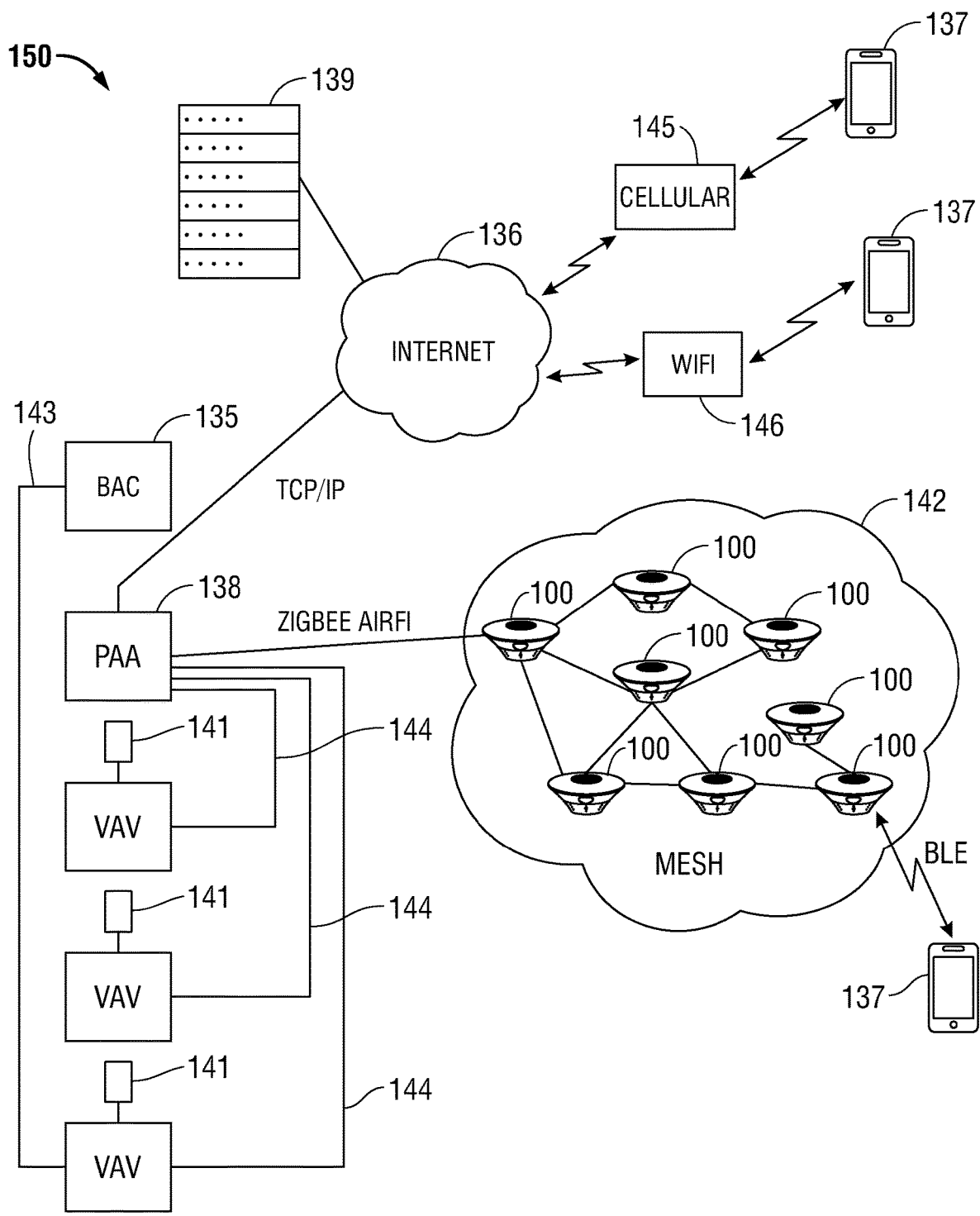
FIG. 6 is schematic diagram of a microzone HVAC system having a precision air aggregator in a network configuration according to another exemplary embodiment of the present disclosure.

FIG. 6 illustrates another embodiment of a personalized comfort HVAC system 150 in which a thermostat 141 is communicatively coupled to an associated VAV box 132 to adjust the flow of conditioned air into the conditioned space. In a typical installation, thermostat 141 and VAV box 132 are hardwired or otherwise operatively linked together to enable thermostat 141 to control VAV 132 without the involvement of BAC 135 or other intermediary control device. PAA 138 is connected to VAV box 132 in a thermostat override configuration whereby control of VAV box 132 by thermostat 141 is superseded by commands received from PAA 138. For example, VAV box 132 may provide a "thermostat override" input to which PAA 138 is connected and which gives priority to a control signal received from PAA 138 over a control signal received from thermostat 141. In another embodiment, a relay or other switching circuit may be used to switch control of VAV box 132 from thermostat 141 to PAA 138. In still another embodiments, PAA 138 takes the place of thermostat 141 by utilizing the same electrical interface as thermostat 141.

Figure 7:
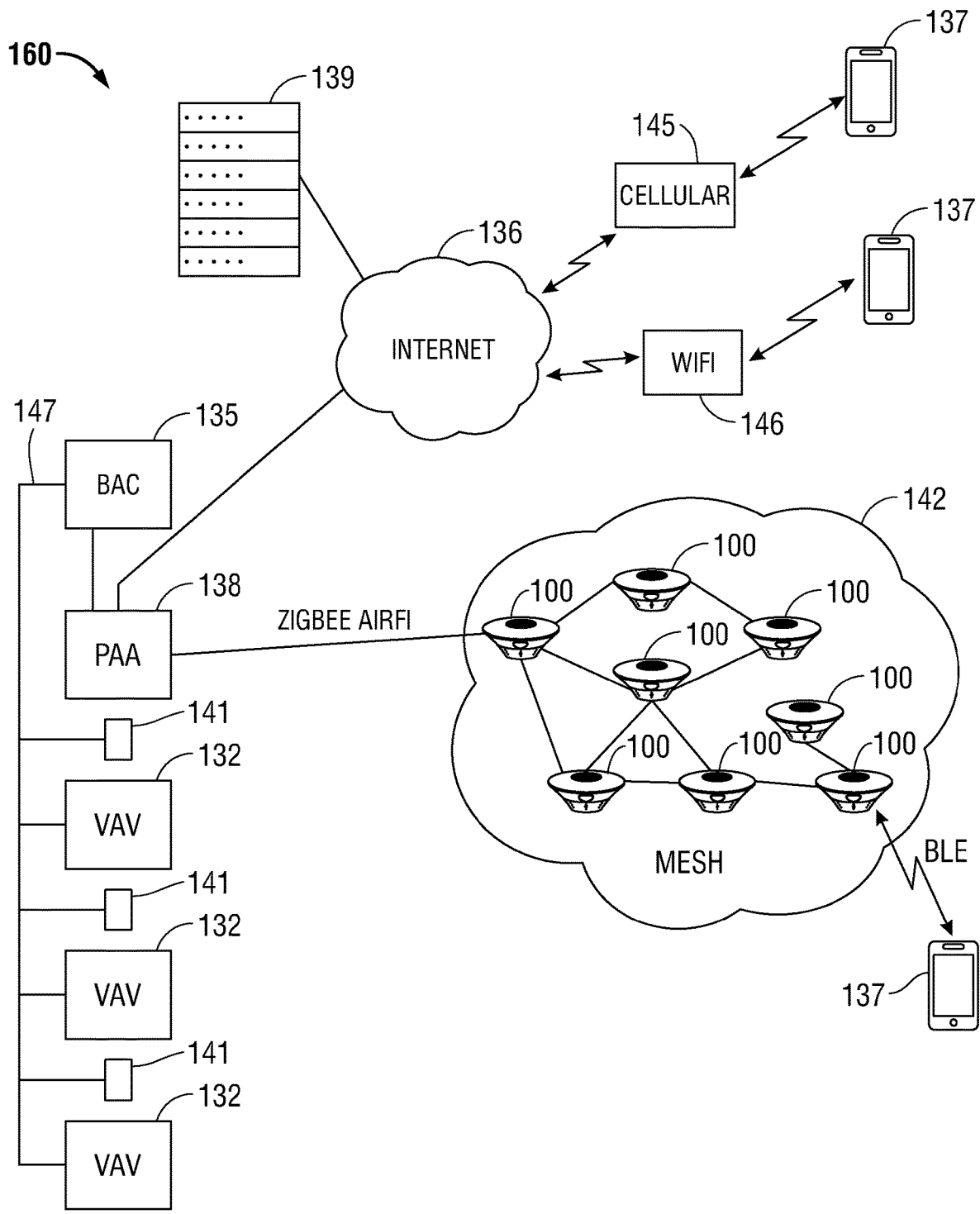
FIG. 7 is schematic diagram of a microzone HVAC system having a precision air aggregator in a network configuration according to yet another exemplary embodiment of the present disclosure.

FIG. 7 illustrates yet another integration scenario in which BAC 135 communicates with thermostat 141 and VAV box 132 using a proprietary protocol or an alternative protocol such as LONWORKS®. In this embodiment, PAA 138 communicates with BAC 135 using any protocol which is supported by both devices, for example BACnet. In the FIG. 7 example, PAA 138 is coupled to BAC 135 by a dedicated BACnet link 148. In situations where BAC 135 is connected to a general purpose data network, such as the Internet 136, PAA 138 and BAC 135 are configured to communicate through the data network and may interoperate using such data exchange protocols as REST, SOAP, and/or JSON.

Figure 8B:
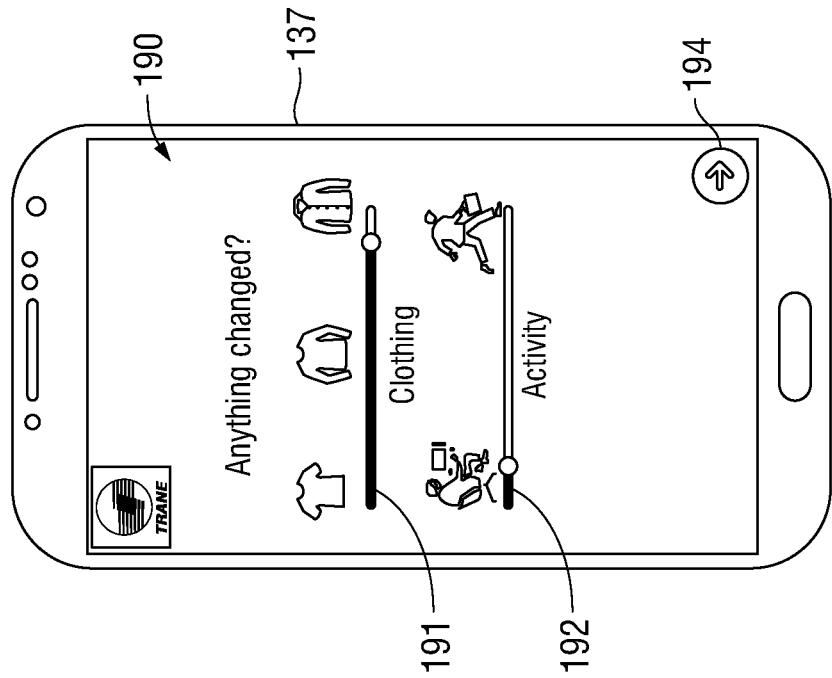
FIGS. 8A and 8B illustrate a user device user interface in accordance with an exemplary embodiment of the present disclosure.
Figure 8A:
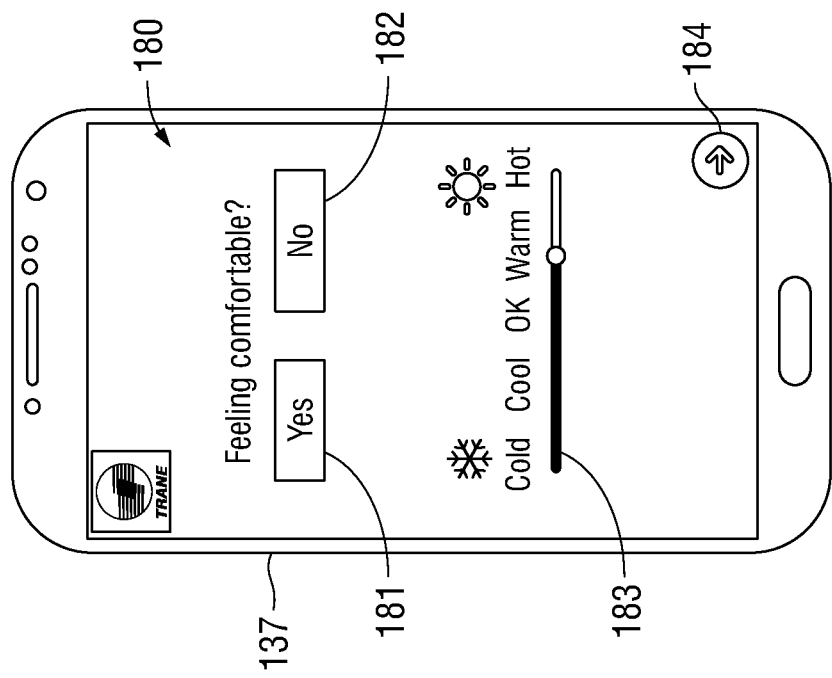
Figure 9:
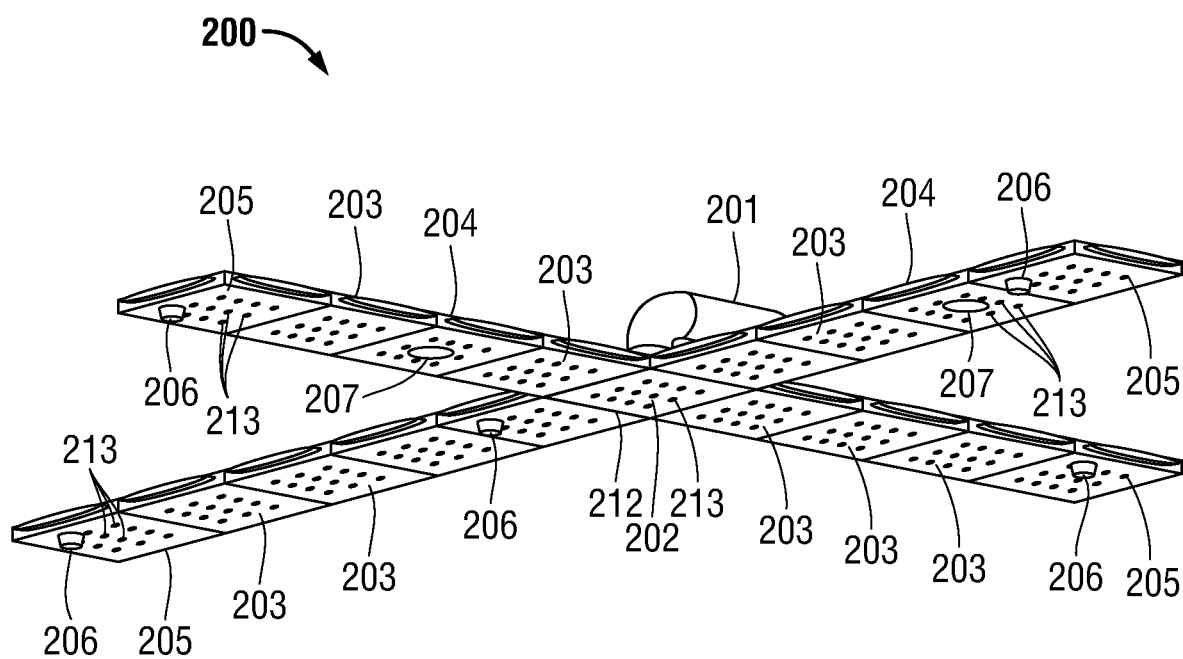
FIG. 9 is a perspective view of a personalized air distribution system in accordance with an exemplary embodiment of the present disclosure.
Figure 10:
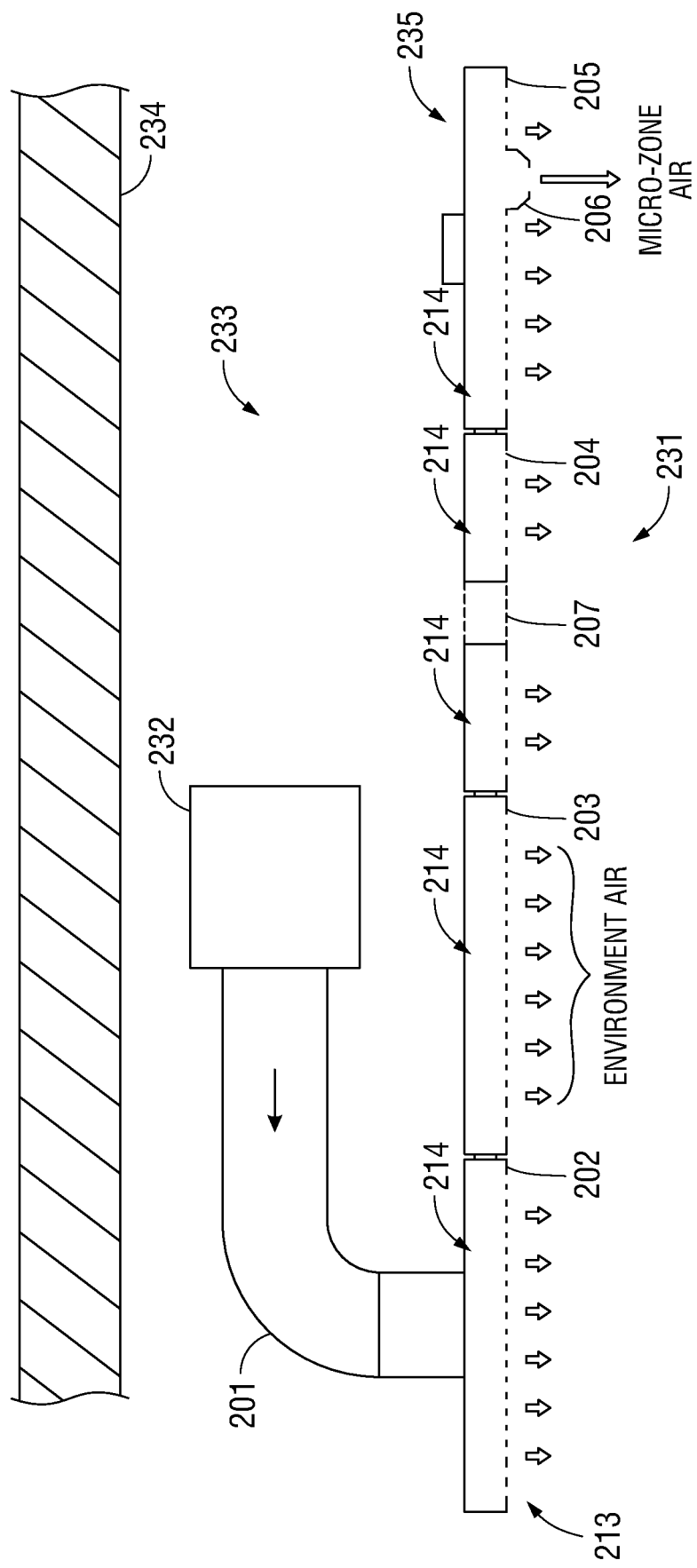
FIG. 10 is a schematic view of a personalized air distribution system in accordance with an exemplary embodiment of the present disclosure.
Figure 11A:
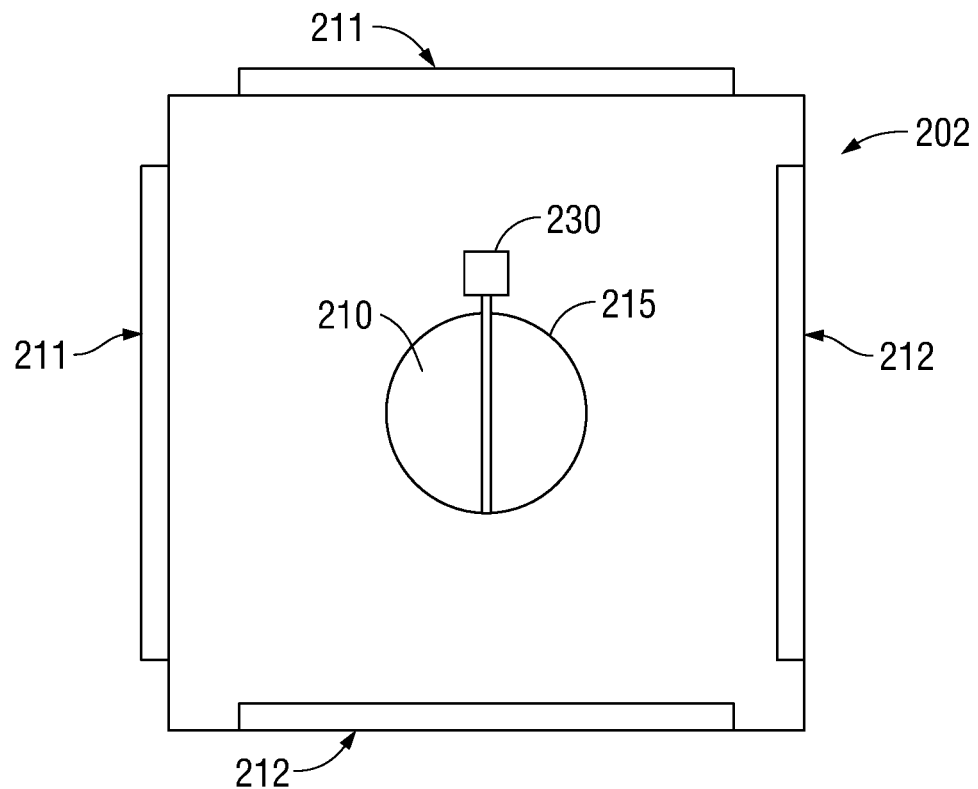
FIGS. 11A and 11B are schematic views of a supply panel of a personalized air distribution system in accordance with an exemplary embodiment of the present disclosure.
Figure 11B:
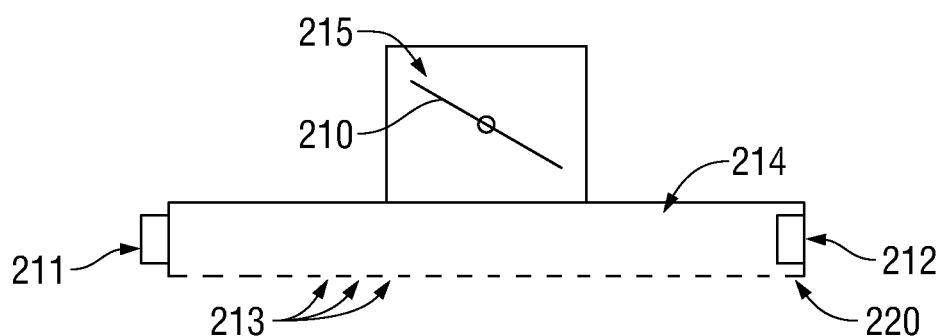

An occupant of a work station in the conditioned space employs user device 137 to communicate with remote server 139 and/or precision air device 100 to indicate his or her comfort preferences, e.g., whether the temperature feels too warm or too cold, and to indicate other factors which could influence the user's perceived comfort. User device 137 communicates its presence at the work station to the precision air device 100 installed at the work station. FIG. 8A depicts an exemplary comfort user interface (UI) 180 of an application program 151 ("app") executing on user device 137 that includes a pair of comfort selection buttons 181, 182 and a comfort slider 183. The user inputs his or her present level of comfort by either tapping the "Feeling comfortable?" Yes button 181 or the "Feeling comfortable?" No button 182 as appropriate. If the user is feeling uncomfortable, the user may manipulate comfort slider 183 to indicate the amount and nature of the discomfort (e.g., too cool, just a little cool, OK, a little warm, or too hot). A navigation button 184 may be used to navigate to another user interface 190 which enables a user to indicate whether the user's personal status has changed. As seen in FIG. 8B, user interface 190 includes an "Anything changed?" slider 191 that enables the user to indicate whether he or she is currently wearing lighter or heavier clothing (e.g., short sleeves, long sleeves, jacket, etc.). An "Activity" slider 192 enables the user to indicate his or her current metabolic state, (e.g., low physical activity, moderate physical activity, strenuous physical activity etc.).

In an embodiment, user inputs are transmitted from user device 137 to remote server 139. Remote server 139 receives the user preferences and user status information from user device 137 and records this information in the user's profile history. Remote server 139 additionally receives environmental information relating to the area in which the user is located, such as, without limitation, temperature, relative humidity, local outdoor temperature, mean radiant temperature, occupancy and air velocity. Environmental information may be obtained from thermostats 141, sensors 149, intake sensor 117, and/or proximity sensors 106. Additionally or alternatively, environmental data may be obtained from a weather data service provider. Remote server 139 processes the user information received from user device 137 to determine what, if any adjustment should be made to the operating parameters of precision air device 100 in response to the updated user information. For example, if the user indicated he or she was too warm, remote server 139 may transmit a command to precision air device 100 to increase the damper opening of the outlet nozzle 105 associated with the user's work station in order to increase air flow to the user. Additionally or alternatively, the remote server 139 may transmit a command to precision air device 100 to increase impeller speed and/or decrease the damper opening of the other outlet nozzles 105 i.e., those that are not associated with the user's work station. In other embodiments, remote server 139 may transmit a command to precision air device 100 to increase or decrease the airflow through the outlet nozzle 105 associated with the user's work station, without regard to the manner in which the change in airflow is achieved. In these embodiments, controller 120 determines whether to change damper position and/or impeller speed. The increments of damper position change, impeller speed change, and/or airflow change may be specified within the commands transmitted from remote server 139 to precision air device 100.

In embodiments, remote server 139 employs a predictive mean vote (PMV) or similar technique to assess the preferences of a plurality of users of the conditioned space and to identify comfort trends within the conditioned space. This enables the system to reduce energy consumption by delivering conditioned air only where needed by raising the overall macrozone setpoint temperature and reducing total airflow, while maintaining comfort by analyzing user comfort feedback to determine which areas require greater airflow to maintain comfort and in which areas less airflow will suffice to maintain comfort. In certain embodiments, a seasonal adjustment is applied to maintain user comfort in view of weather conditions, e.g., zone setpoint, zone airflow, and/or individual airflow are adjusted to compensate for building thermal gains or losses caused by seasonal temperature variations and/or physiological changes. For example, occupants may experience chills more easily in winter, therefore airflows may be decreased in winter to avoid this effect.

In some embodiments, the user inputs are transmitted from user device 137 to precision air device 100. Precision air device 100 receives the user inputs, which are processed with the current temperature, relative humidity, and current airflow from the user's outlet nozzle 105, to determine whether to increase or decrease airflow from the user's outlet nozzle 105. Air flow may be changed by changing the speed or impeller 109, changing the position of actuator 111 to adjust the opening of damper 118, or a combination of speed change and damper change. Precision air device 100 communicates the user inputs to remote server 139 for storing into the user's comfort profile.

In some embodiments, the functions, processes and communications described as being performed by remote server 139, PAA 138 and/or precision air device 100 may be performed by one or more of the other devices. For example, the functions of remote server 139 may be performed in whole or in part by PAA 138. The functions of PAA 138 may be performed by one or more of precision air devices 100. In an embodiment, the functions of remote server 139, PAA 138 and/or precision air device 100 may be distributed among and between each of these devices to provide a local processing and data storage cloud. In these embodiments, profile and other data may be replicated among remote server 139, PAA 138 and/or precision air devices 100 to provide automated backup, increase system reliability, mitigate the effects of device or communication failure, and to automatically replicate data to new or replacement devices to facilitate rapid provisioning of such devices.

Another example embodiment of a personalized air distribution system 200 is illustrated in FIGS. 9 through 14B and includes set of interlocking flat-panel ducts that selectively deliver conditioned air to microzones within the conditioned space. Conditioned air is delivered from a VAV box 232 through a duct 201 into an intake port 215 of supply panel 202. Supply panel 202 may, in turn, be coupled to any of a plenum panel 203, a comfort panel 205, and/or a return panel 207.

Supply panel 202, plenum panel 203, comfort panel 205, return panel 207 share a number of features, which are described with reference to supply panel 202 and also pertain to plenum panel 203, comfort panel 205, and return panel 207. A lower surface 220 of supply panel 202 includes a plurality of perforations 213 defined therein that enables a baseline volume of conditioned air to flow from panel air duct 214 into the conditioned space. A male panel air connector 211 is disposed on each of two sides of supply panel 202. A mating female panel air connector 212 is disposed on the remaining two sides of supply panel 202. Male panel air connector 211 and female panel air connector 212 are configured to operatively couple adjacent panels to provide airflow communication and mechanical coupling between panels. In an embodiment, panel air connectors 211 and 212 include a self-actuating valve that enables airflow therebetween when panel connectors 211 and 212 are engaged and prevents airflow when either panel connector 211 or 212 is disengaged. In an embodiment, a removable cover (not shown) may be employed to seal any unused panel connectors 211 and/or 212. In embodiments, other arrangements of male and female couplings, hermaphroditic couplings, or other keying or locking features may be employed to couple the described panels.

Supply panel 202 (FIGS. 11A and B) includes a remotely-adjustable damper 210 that adjusts the airflow from intake port 215 into a hollow interior portion of supply panel 202 defining a panel air duct 214. An actuator 230 is operatively coupled to damper 210 to adjust the position thereof.

Figure 12A:
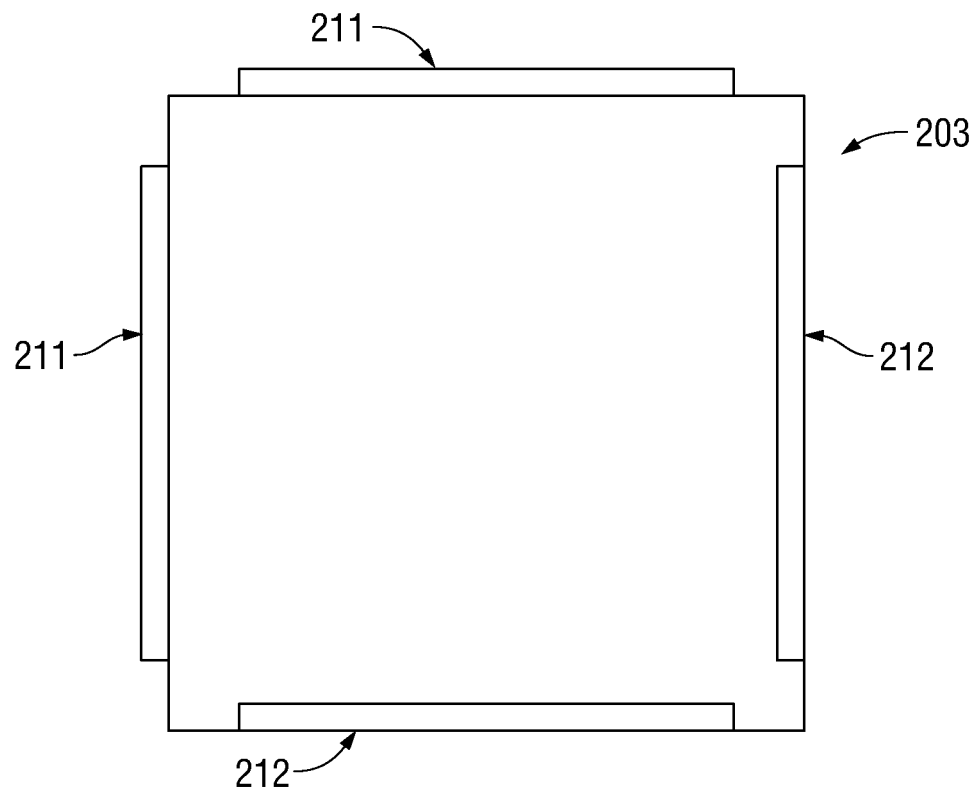
FIGS. 12A and 12B are schematic views of a plenum panel of a personalized air distribution system in accordance with an exemplary embodiment of the present disclosure.
Figure 12B:
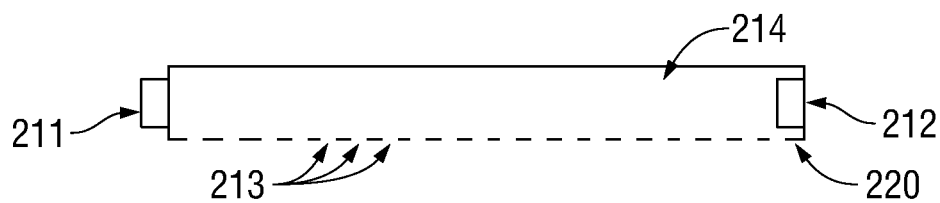
Figure 13A:
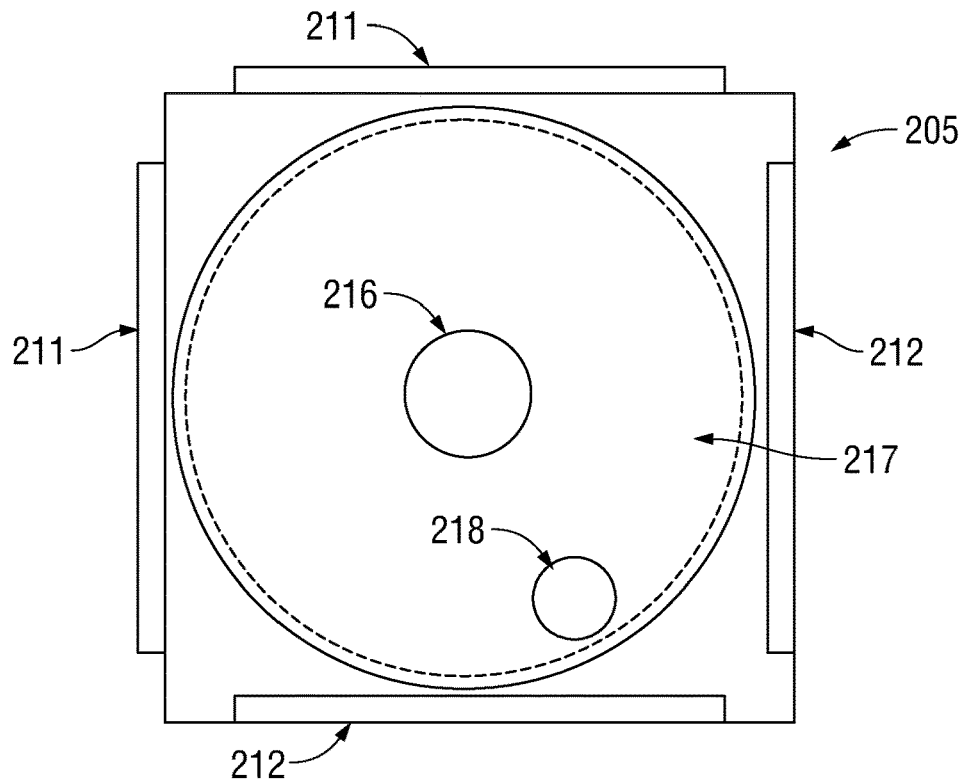
FIGS. 13A, 13B, and 13C are schematic views of a comfort panel of a personalized air distribution system in accordance with an exemplary embodiment of the present disclosure.
Figure 13B:
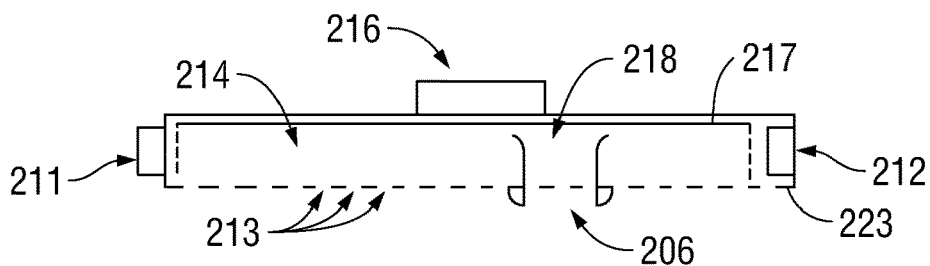
Figure 13C:
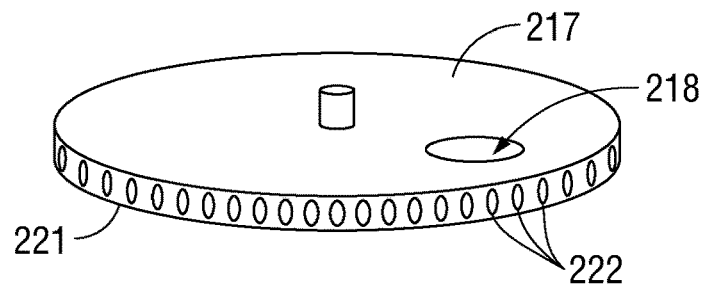
Figure 14A:
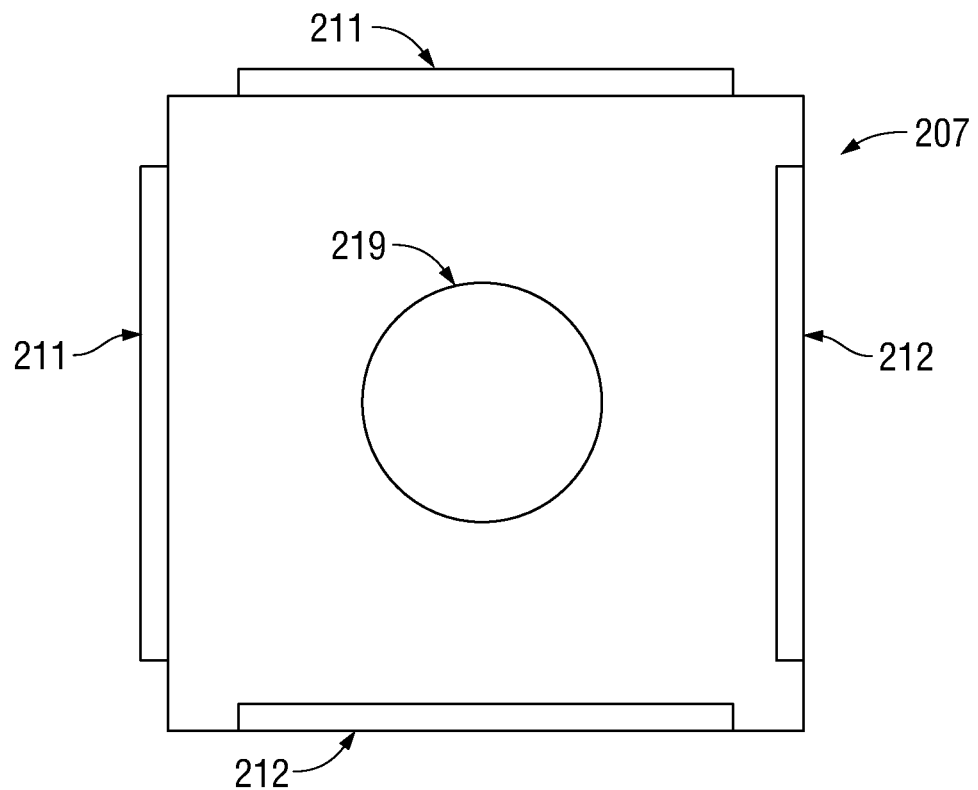
FIGS. 14A and 14B are schematic views of a return panel of a personalized air distribution system in accordance with an exemplary embodiment of the present disclosure.
Figure 14B:
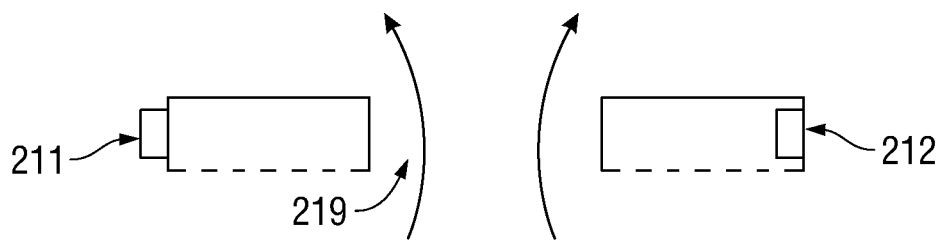

As illustrated in FIGS. 12A and 12B, plenum panel 203 is used to deliver a baseline volume of conditioned air to the conditioned space and distribute conditioned air via panel air duct 214 to any adjacent panels to which plenum panel 203 may be joined.

Comfort panel 205 includes a damper motor 216 that is configured to rotate a circular damper disk 217 disposed within panel air duct 214. Damper disk 217 includes a ring 221 extending downwardly from the circumferential periphery of damper disk 217. A plurality of slots 222 defined in ring 221 enables air to flow from panel air connectors 211 and 212 into panel air duct 214 of comfort panel 205. An outlet duct 206 is defined in a lower surface 223 of comfort panel 205. Damper disk 217 includes an opening 218 defined therein that is configured to rotate into and out of alignment with outlet duct 206 as damper disk 217 is turned by damper motor 216, which, in turn, adjusts the comfort air stream expelled from outlet duct 206 into the target microzone. Damper motor 216 may be remotely controlled by any one, some, or all of the aforementioned control elements, e.g., BAC 135, PAA 138, user device 137, and/or remote server 139 to augment the baseline airflow provided by a plurality of perforations 213 to provide a personalized comfort air stream to an occupant of the targeted microzone.

Return panel 207 (FIGS. 14A and B) includes a return duct 219 disposed therein that allows return air to flow from the conditioned space 231 (FIG. 10) into a return plenum 233 defined by a space between a building structure 234 (e.g., underside of roof or next floor above) and a ceiling 235 of the conditioned space. Return duct 219 isolates return air flowing therethough from conditioned air flowing though panel air duct 214.

Figure 15:
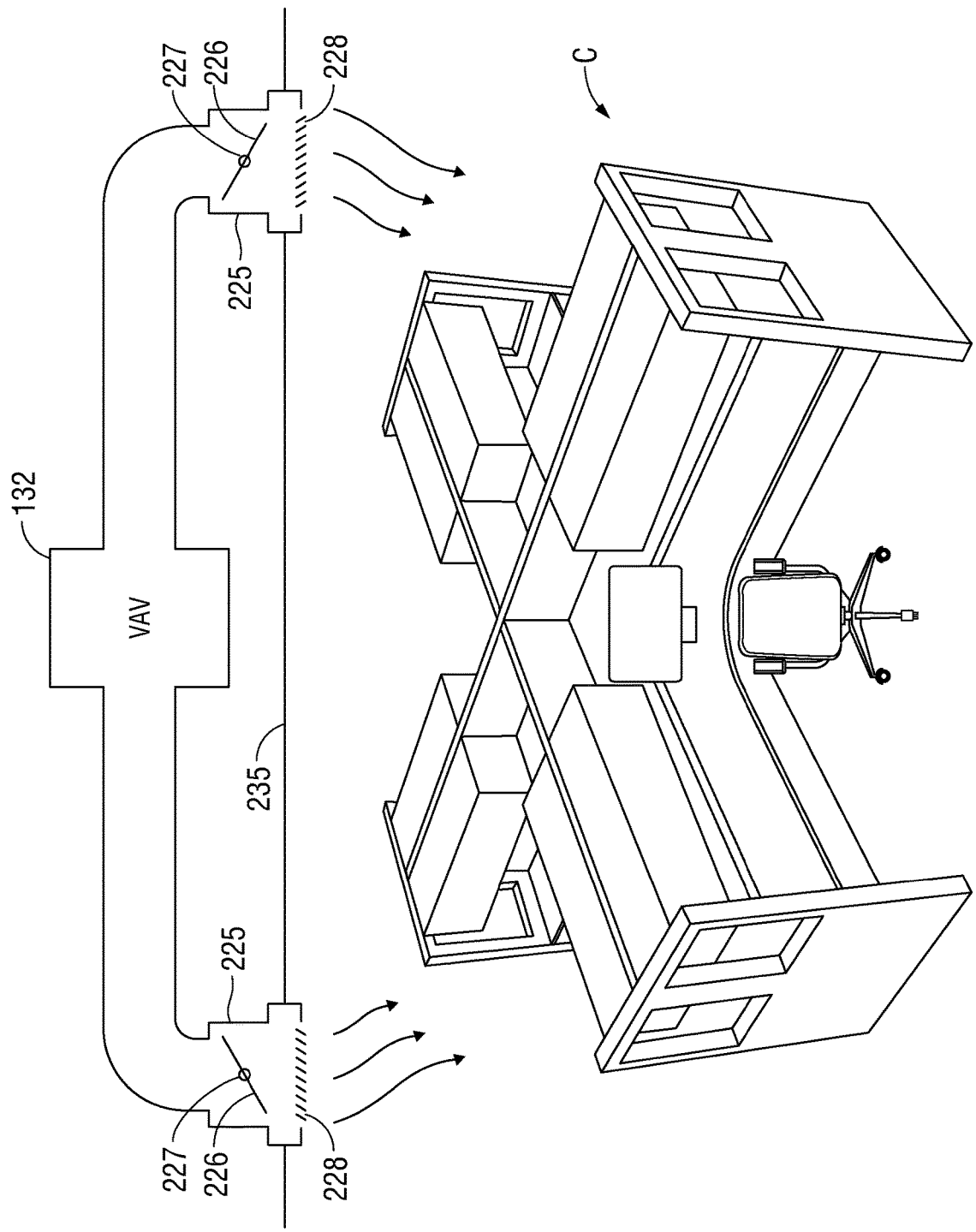
FIG. 15 illustrates another example embodiment of a microzone HVAC system in accordance with the present disclosure.

FIG. 15 illustrates an example embodiment of the present disclosure that includes precision air diffuser 225. Precision air diffuser 225 is configured for mounting on a ceiling 235, wall or other structure of a conditioned space. Preferably, precision air diffuser 225 is mounted above a cubicle C or microzone to provide a personalized airstream to an occupant of the cubicle or microzone. Precision air diffuser 225 includes a damper 226 that is adjusted by damper motor 227. Conditioned air supplied to precision air diffuser 225 by VAV 132 is regulated by damper 226 and flows through an outlet grille 228 into the conditioned space. Damper motor 227 may be remotely controlled by any one, some, or all of the aforementioned control elements, e.g., BAC 135, PAA 138, user device 137, and/or remote server 139 to adjust the position of damper 226 to regulate airflow from outlet grille 228 to provide a personalized comfort air stream to an occupant of the target cubicle or microzone.

Figure 16:
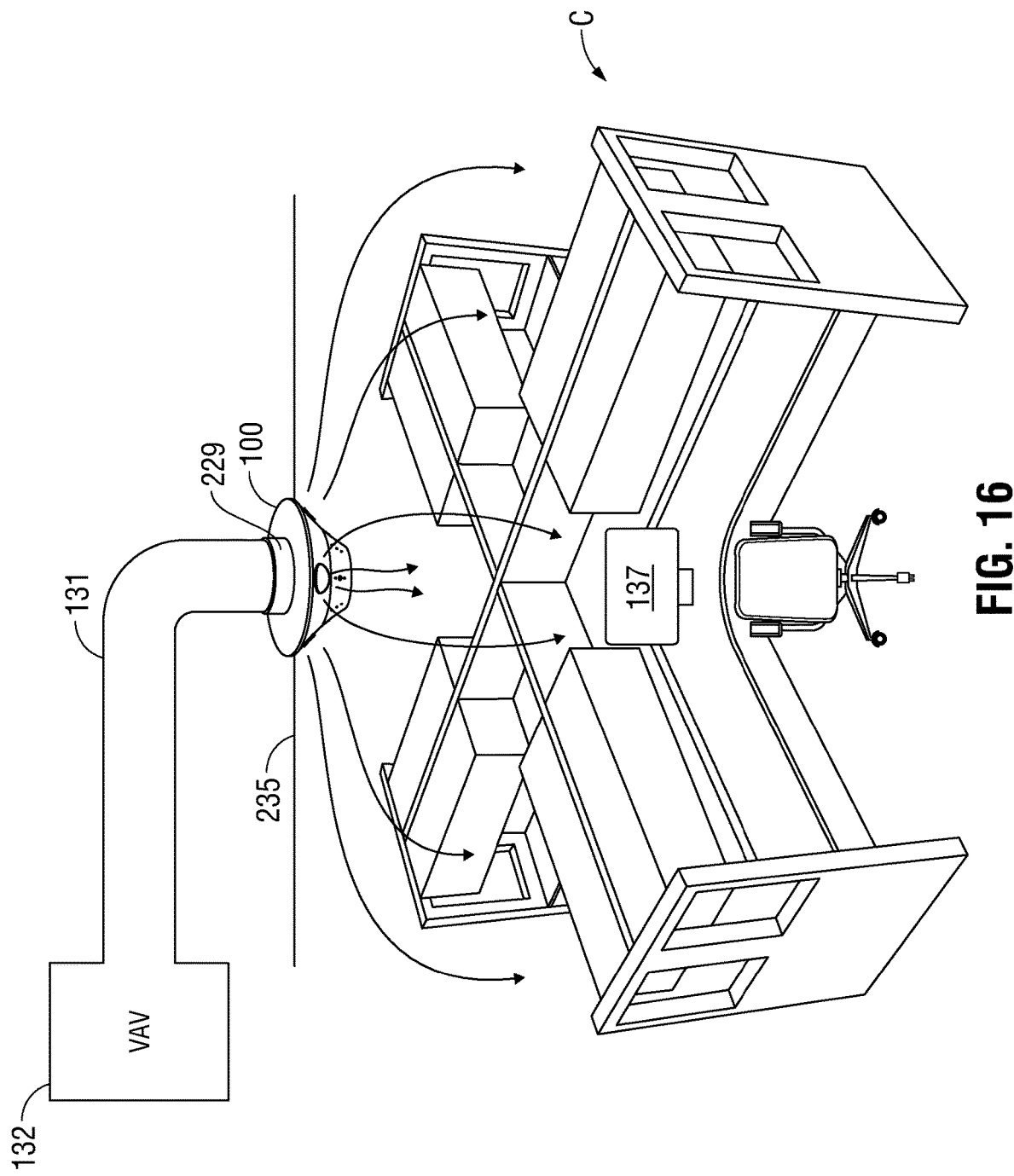
FIG. 16 illustrates yet another example embodiment of a microzone HVAC system in accordance with the present disclosure.

FIG. 16 illustrates another example embodiment of the present disclosure in which precision air device 100 is mounted above one or more microzones, for example, on a ceiling 235 positioned above an arrangement of cubicles. In this embodiment, conditioned air is delivered from VAV 132 to intake 103 of precision air device 100 by duct 131. Duct 131 may be coupled to precision air device 100 by a fitting 229 attached to intake 103. Fitting 229 may be integrated into a ceiling-mount embodiment of precision air device 100 and/or may be configured as an adapter that is selectively attachable to precision air device 100. Fitting 229 may optionally include a bracket configured to attach precision air device 100 to ceiling 235. Personalized airstreams descend from outlet nozzles 105 to provide enhanced comfort to one or more occupants below.

Control of VAV airflow and the individual microzones served by a VAV is achieved by aggregating environmental parameters and user parameters. Environmental parameters include the local microzone temperature $T_L$ and local relative humidity $RH_L$ as measured by intake sensor 117, the average zone temperature $T_Z$, and the air velocity Va at outlet nozzle 105. Average zone temperature $T_Z$ may be an average zone temperature measured by thermostat 141, or may be a weighted average of the local microzone temperatures $T_L$ in the microzones associated with the VAV macrozone.

User parameters include a comfort index CI associated with a microzone occupant. The value of CI may vary from −1 to 1, where CI=−1 for the person who feels comfortable at cold indoor conditions and 1 for the person who feels comfortable at hot indoor conditions. Normal indoor conditions (e.g., normal comfort) may be benchmarked as the comfort condition for 95% of the population as described in ASHRAE Std. 55. Clothing index CLO characterizes the type of clothing worn by the person. For example, a user wearing t-shirt and shorts could be characterized as having a low CLO index, one wearing a business suit or dress would be characterized as having a medium CLO index, and a user wearing a sweater, scarf, hat, or coat could be characterized as having a high CLO index. Metabolic index MET characterizes the user's level of physical activity. A user who is quietly sitting at a desk could be characterized has having a low MET index, someone who is engages in moderate physical activity could be characterized has having a medium MET index, and a person who is engaged in heavy activity, or for example has just finished a run, could be characterized as having a high MET index.

Figure 17:
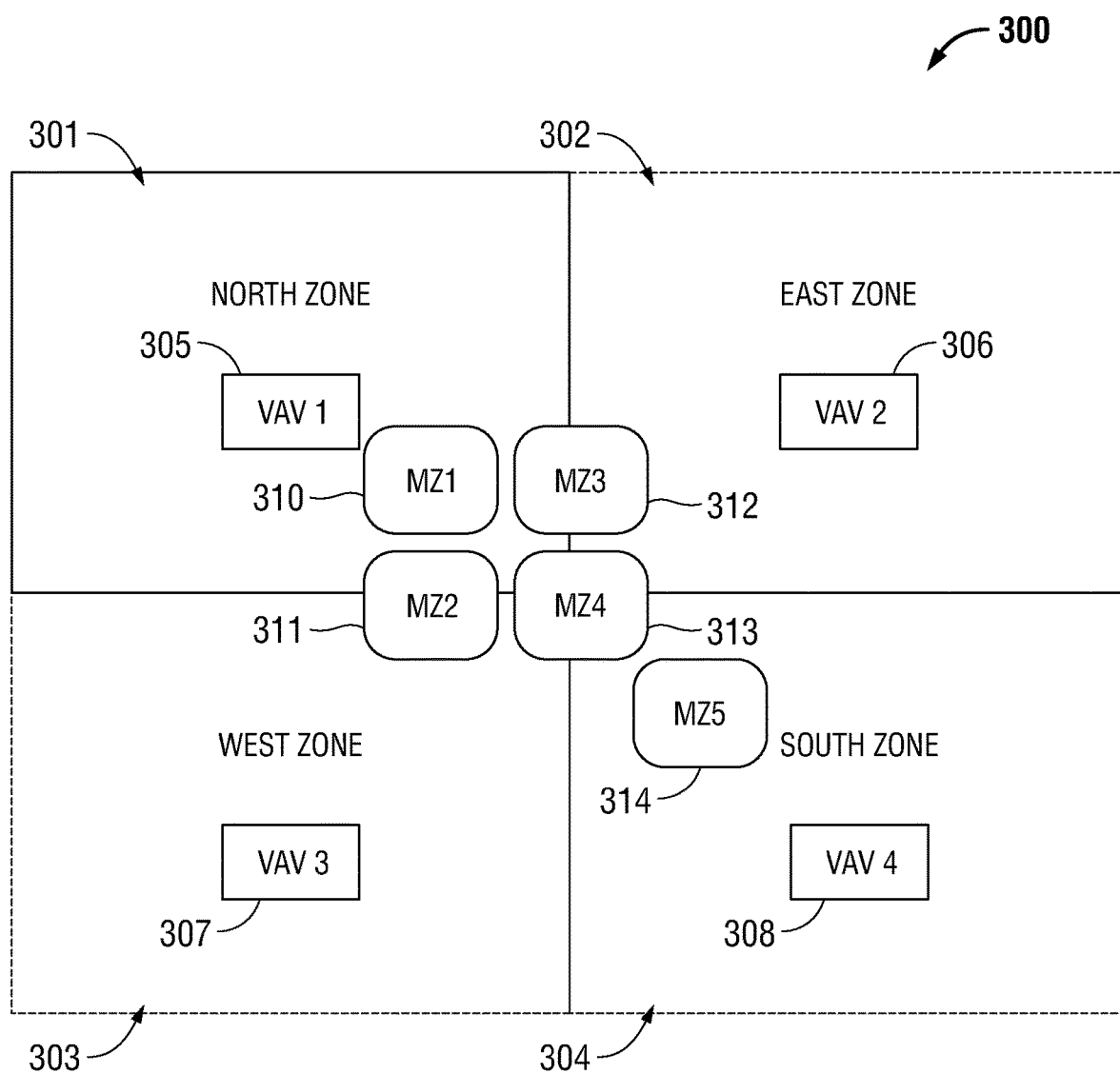
FIG. 17 is a block diagram of an arrangement of zones and microzones of a microzone HVAC system in accordance with an exemplary embodiment of the present disclosure.

In some instances, a single VAV may serve one or more microzones and a single microzone may be served by one or more VAVs. For example, as shown in FIG. 17, conditioned space 300 includes a number of zones and microzones. North zone 301 is served by VAV 305, east zone 302 is served by VAV 306, west zone 303 is served by VAV 307, and south zone 304 is served by VAV 308. Microzone 310 is fully within north zone 301. Microzone 311 straddles zones 301 and 303 while microzone 312 straddles zones 301 and 302. Equal quarters of microzone 313 are situated between zones 301, 302, 303, and 304. Microzone 314 lies fully within zone 304.

In one aspect of the present disclosure, the effective zone temperature is determined by calculating a weighted average of the individual micro zone temperatures based upon a weighting factor table. An exemplary zone weighting factors (ZW) for the microzones of conditioned space 300 is illustrated in Table 1:

TABLE 1

|      | VAV 1     | VAV 2     | VAV 3     | VAV 4     |
|------|-----------|-----------|-----------|-----------|
| MZ 1 | ZW = 1    | ZW = 0    | ZW = 0    | ZW = 0    |
| MZ 2 | ZW = 0.5  | ZW = 0    | ZW = 0.5  | ZW = 0    |
| MZ 3 | ZW = 0.5  | ZW = 0.5  | ZW = 0    | ZW = 0    |
| MZ 4 | ZW = 0.25 | ZW = 0.25 | ZW = 0.25 | ZW = 0.25 |
| MZ 5 | ZW = 0    | ZW = 0    | ZW = 0    | ZW = 1    |

The target zone temperature for a VAV may be computed using the formula $$T_{Z,VAV} = \frac{\sum_{i=1}^{n} ZW_i * T_{L,i}}{\sum_{i=1}^{n} ZW_i}.$$

The damper 113 of the target VAV is then adjusted so the effective zone temperature for that zone converges to the setpoint zone temperature. Using Table 1 as an example, the temperature for VAV 1 is computed as $$T_{Z,VAV1} = \frac{1 * T_{L,MZ_1} + 0.5 * T_{L,MZ_2} + 0.5 * T_{L,MZ_3} + 0.25 * T_{L,MZ_4}}{2.25}.$$

Zone temperature and microzone air velocity are factors that are adjusted by the system to influence perceived temperature. Precision air device 100 is configured to deliver a personalized air stream at velocities ranging from zero to about 300 feet per minute (fpm). For example, at a setpoint zone temperature of 77° F., the perceived temperature range is from 77° F. with a personalized air stream velocity of zero (e.g., precision air device 100 is off) to about 72° F. with an air stream velocity of 150 fpm and to about 71° F. with an airstream velocity of 300 fpm. Thus, at 77° F. the system has the capability to vary perceived temperature of a microzone over about a 6° F. range. This capability enables the system to operate in a "maximum savings" mode, where setpoint zone temperature is set to a higher temperature and microzones operate with high airstream velocity to provide an overall cooler perceived temperature. Optionally or alternatively, this capability enables the system to operate in a "maximum comfort" mode, where the full range of microzone airstream velocities, and hence, perceived temperatures, are utilized to provide personalized comfort to occupant(s) of each microzone within about a 6° F. range.

Figure 18:
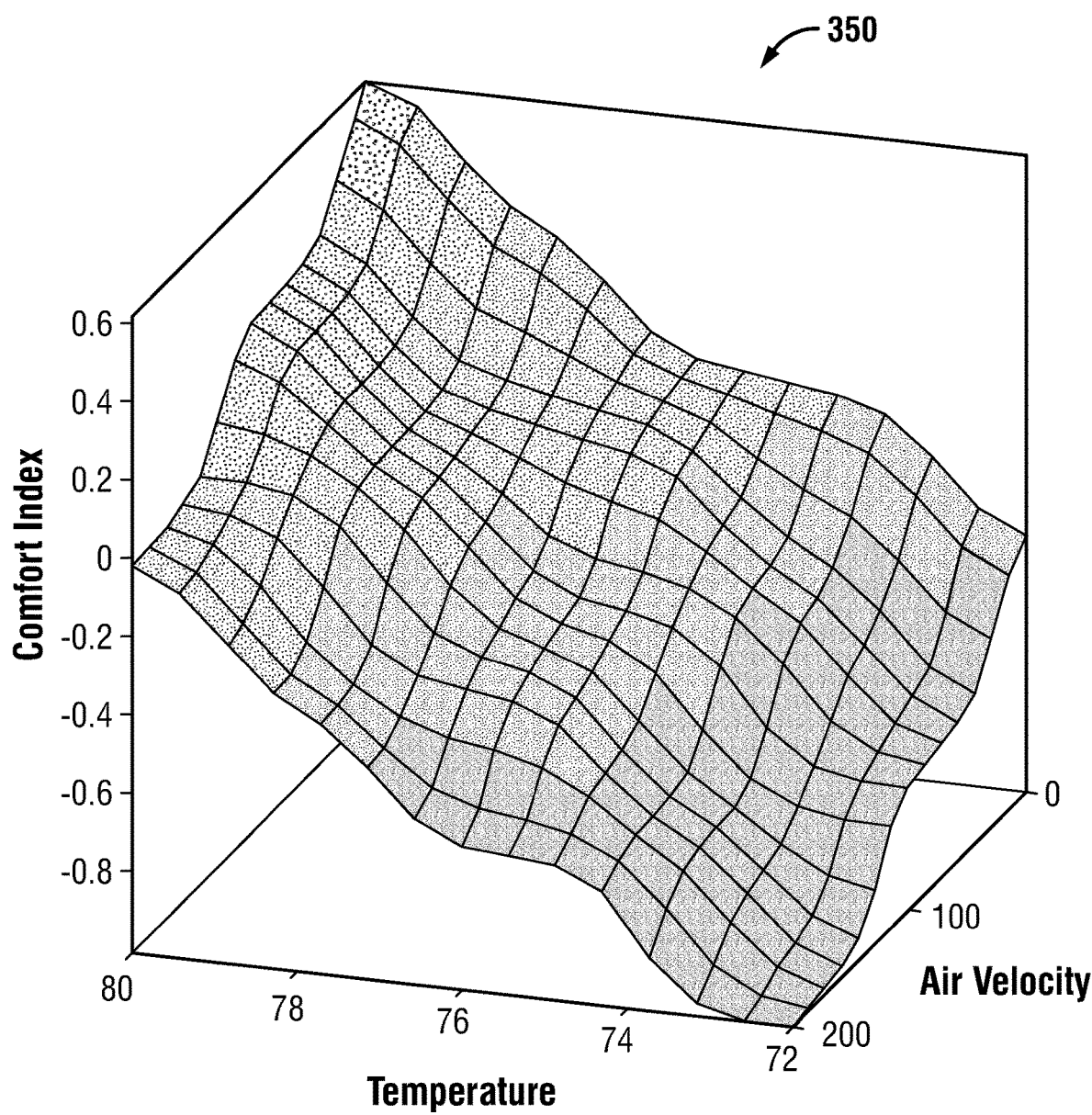
FIG. 18 is a graphic representation of a dynamic comfort index model in accordance with an embodiment of the present disclosure.

In another aspect of the present disclosure, FIG. 18 illustrates a dynamic comfort index model 350 that is established to express the comfort index CI of an individual as a function of the five microzone climate and personal parameters, e.g., local microzone temperature $T_L$, nozzle air velocity Va, clothing index CLO, metabolic index MET, and local relative humidity $RH_L$. In an embodiment, these parameters and CI are recorded with a timestamp in a log to generate the dynamic model. Dynamic comfort index model 350 may be stored as part of the user's comfort profile. In embodiments, dynamic comfort index model 350 is established using fuzzy logic techniques. In embodiments, dynamic comfort index model 350 is established using neural network techniques. Other suitable computational techniques may additionally be employed to build dynamic comfort index model 350. In use, the dynamic comfort index model 350 is used to determine the optimal nozzle air velocity Va necessary to achieve the desired personal comfort of an occupant of a microzone based on that occupant's dynamic comfort index model 350. In an embodiment, this can be accomplished by solving the dynamic comfort index model 350 for nozzle air velocity using the formula $CI(i)=f\{T_L(i),V_a(i),clo(i),MET(i),RH_L(i)\}$ where f represents the relationship between local microzone temperature $T_L$, nozzle air velocity Va, clothing index CLO, metabolic index MET, and local relative humidity $RH_L$, or the formula $V_a(i)=f^{-1}\{T_L(i),CI(i),clo(i),MET(i),RH_L(i)\}$, where $f^{-1}$ represents the relationship where CI is an input and Va is an output.

Figure 19:
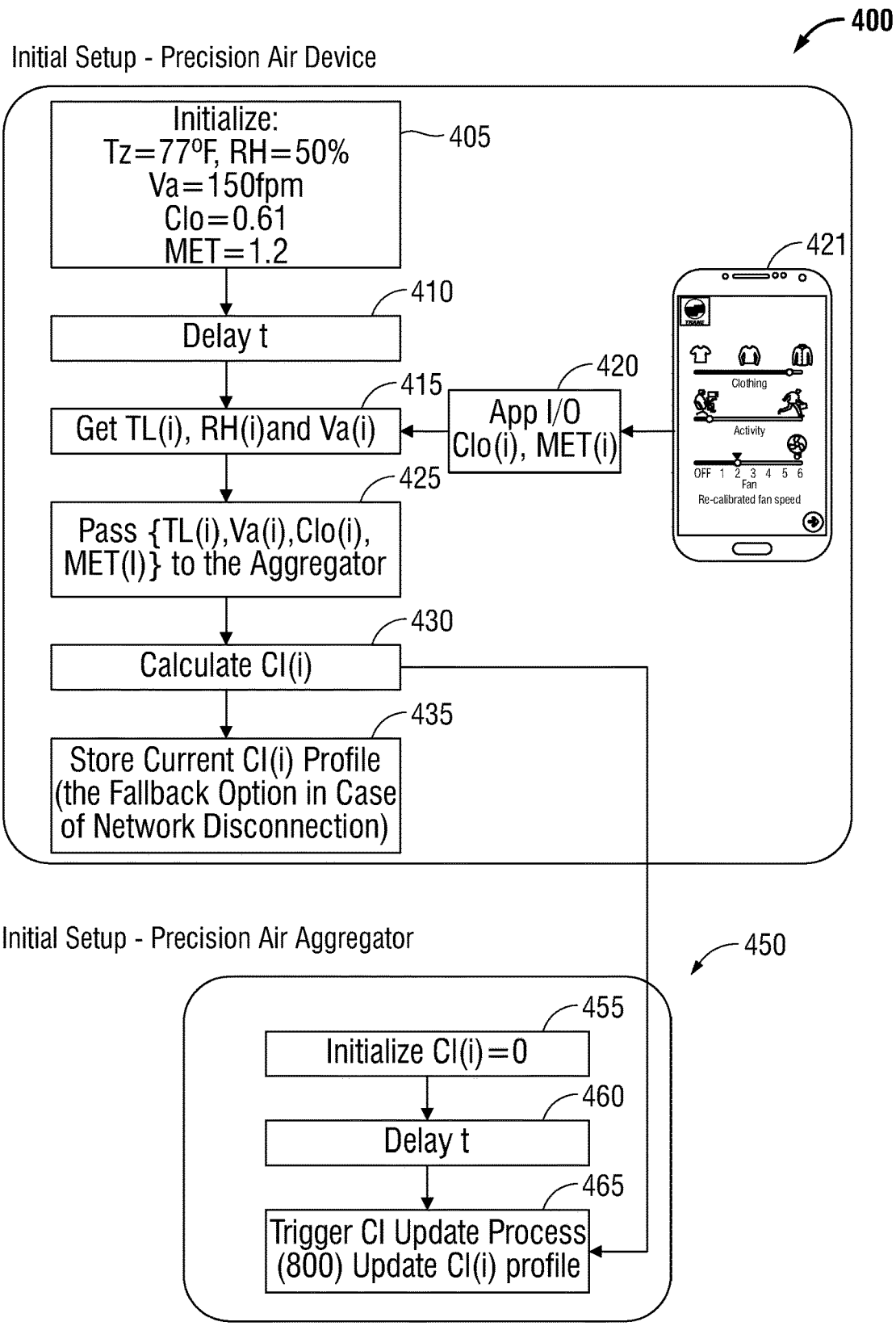
FIG. 19 is a flow diagram of a method of performing an initial setup of a precision air device in accordance with an embodiment of the present disclosure.

In yet another aspect of the present disclosure, a method of operating a microzone HVAC system having precision air devices is described with reference to FIGS. 19-24. In FIG. 19, precision air device initial setup 400 is performed when a precision air device 100 is initialized, such as when it is paired with a microzone user. At block 405 initial values for average zone temperature $T_Z$, local relative humidity $RH_L$, air velocity Va, clothing index CLO, and metabolic index MET are assigned. In some embodiments, these initial values may be determined from a static template established by, for example, an installer or HVAC system operator. In some embodiments, average zone temperature $T_Z$ and local relative humidity $RH_L$ may be determined from dynamic values obtained from, for example, BAC 135. Air velocity Va can be set to a median value, for example 150 ft/min.

At block 410 a time delay is imposed to enable precision air device 100 to stabilize. At block 415 the current local microzone temperature $T_L$, local relative humidity $RH_L$, and nozzle air velocity Va is obtained. At block 420, the user's current clothing index CLO and metabolic index MET are obtained from the user's device (421) and/or retrieved from precision air device 100. At block 425, the current local microzone temperature $T_L$, nozzle air velocity Va, clothing index CLO and metabolic index MET are transmitted to PAA 138. At block 430 the user's comfort index CI is determined from the current conditions and is transmitted to PAA 138 to update the user's profile. Additionally, at block 435 the user's comfort index CI is stored locally. This local copy of the user's CI is used as a fallback measure to enable precision air device 100 to continue functioning in the event network communication is disrupted or other system device becomes unavailable.

Figure 23:
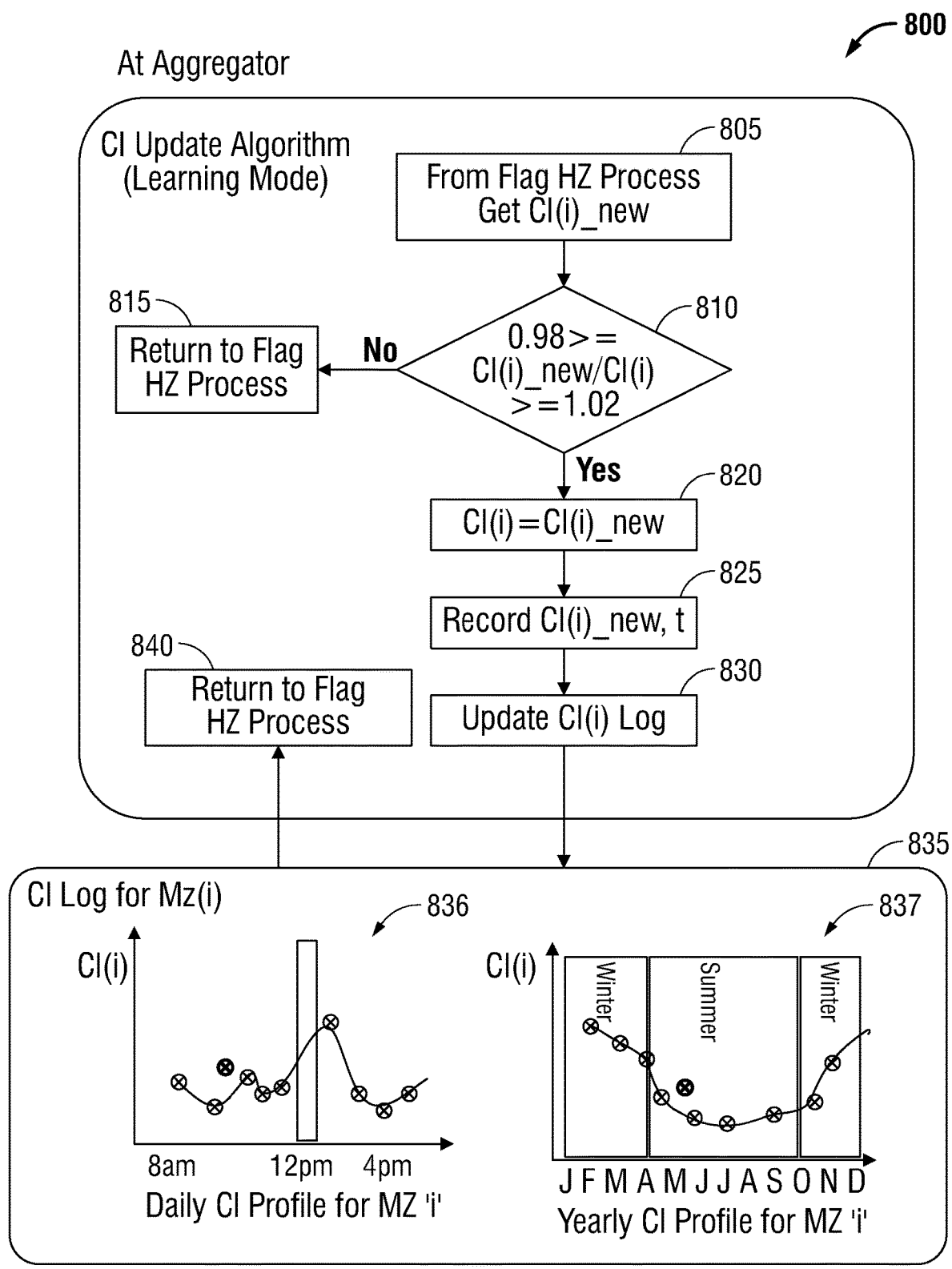
FIG. 23 is a flow diagram illustrating a method of updating a user's comfort index in a microzone HVAC system in accordance with an embodiment of the present disclosure.

Precision air aggregator (PAA) 138 initialization is illustrated at 450. At block 455 a baseline comfort index CI is set to 0. After a delay at block 460, at block 465 the baseline CI is used to update the user's CI profile (FIG. 23, block 800).

Figure 20:
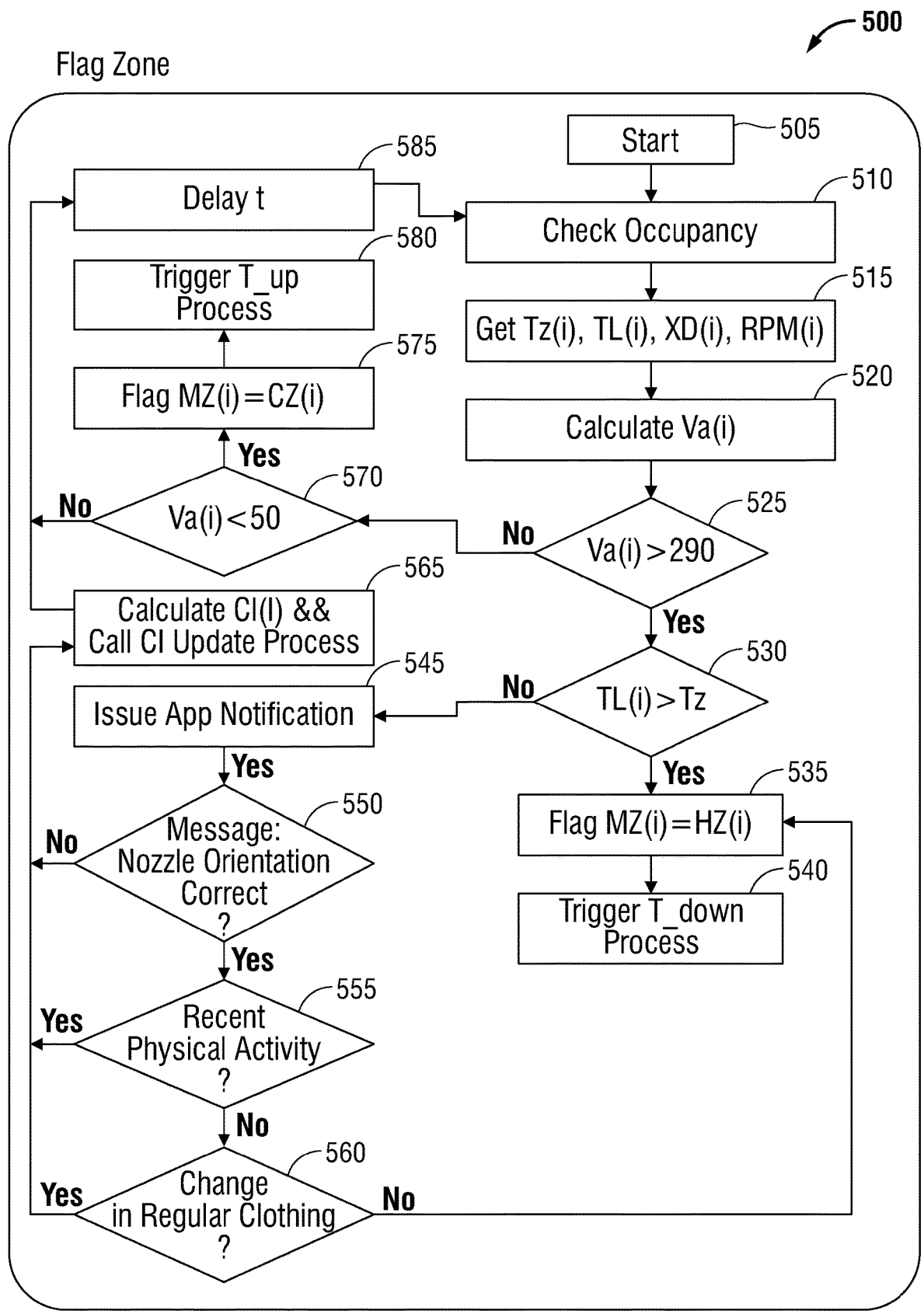
FIG. 20 is a flow diagram of a method of operation of a precision air device in accordance with an embodiment of the present disclosure.

A flowchart 500 illustrating a method of operating precision air device 100 is illustrated in FIG. 20 where microzone status (e.g., a microzone whose occupant is uncomfortably cold or warm) is identified and processed. The method initializes in block 505 and the occupancy of the microzone is determined at block 510 based upon, e.g., a signal from occupancy sensor(s) 106. No further adjustments are performed if the microzone is unoccupied. In block 515 the current operating conditions of precision air device 100 are obtained, such as the average zone temperature $T_Z$, local microzone temperature $T_L$, the position of nozzle damper 118 of the target microzone (XD), and the speed of motor 110 (RPM). The required air velocity Va to provide the appropriate level of perceived cooling to the target microzone is determined in block 520 from the above parameters and the user's comfort index CI and, in block 525, is compared to a predetermined upper threshold. If the resultant air velocity is above the upper threshold, for example 290 ft/min (which can correspond to the upper operating limits of precision air device 100), then in block 530, the microzone temperature $T_L$ is compared to the zone temperature $T_Z$. If microzone temperature $T_L$ exceeds zone temperature $T_Z$, then in block 535 the microzone is flagged as a "hot zone" and the T_down process (FIG. 21, block 600) is triggered at block 540.

If microzone temperature $T_L$ does not exceed zone temperature $T_Z$, then in block 545 precision air device 100 issues a request to user device 137 to solicit user input to determine whether another cause exists for a high air velocity Va result. In block 550 the user is asked to confirm whether the orientation of outlet vent 105 is correct (e.g., pointed towards the user). If it is, then at block 555 the user is asked whether his or her metabolic state has changed. If not, the user is then asked whether the user's clothing has changed from that previously described to the system. If none of these conditions apply, then operation proceeds at block 535 where the microzone is flagged as a "hot zone" and the T_down process is triggered at block 540. If nozzle orientation is correct, or if a change in metabolic activity or clothing weight was indicated, then at block 565 the user's comfort index CI is recalculated and the CI_update process is triggered (FIG. 23, block 800). A time delay is imposed at block 585, and the process iterates to block 510.

Referring back to block 525, if the resultant air velocity does not exceed the predetermined upper threshold, then in block 570 the resultant air velocity is compared to a predetermined lower threshold. If the resultant air velocity is below the lower threshold, for example 50 ft/min (which can correspond to the lower operating limits of precision air device 100), then in block 575 the microzone is flagged as a "cold zone" and the T_up process (FIG. 22, block 700) is triggered at block 580.

Figure 21:
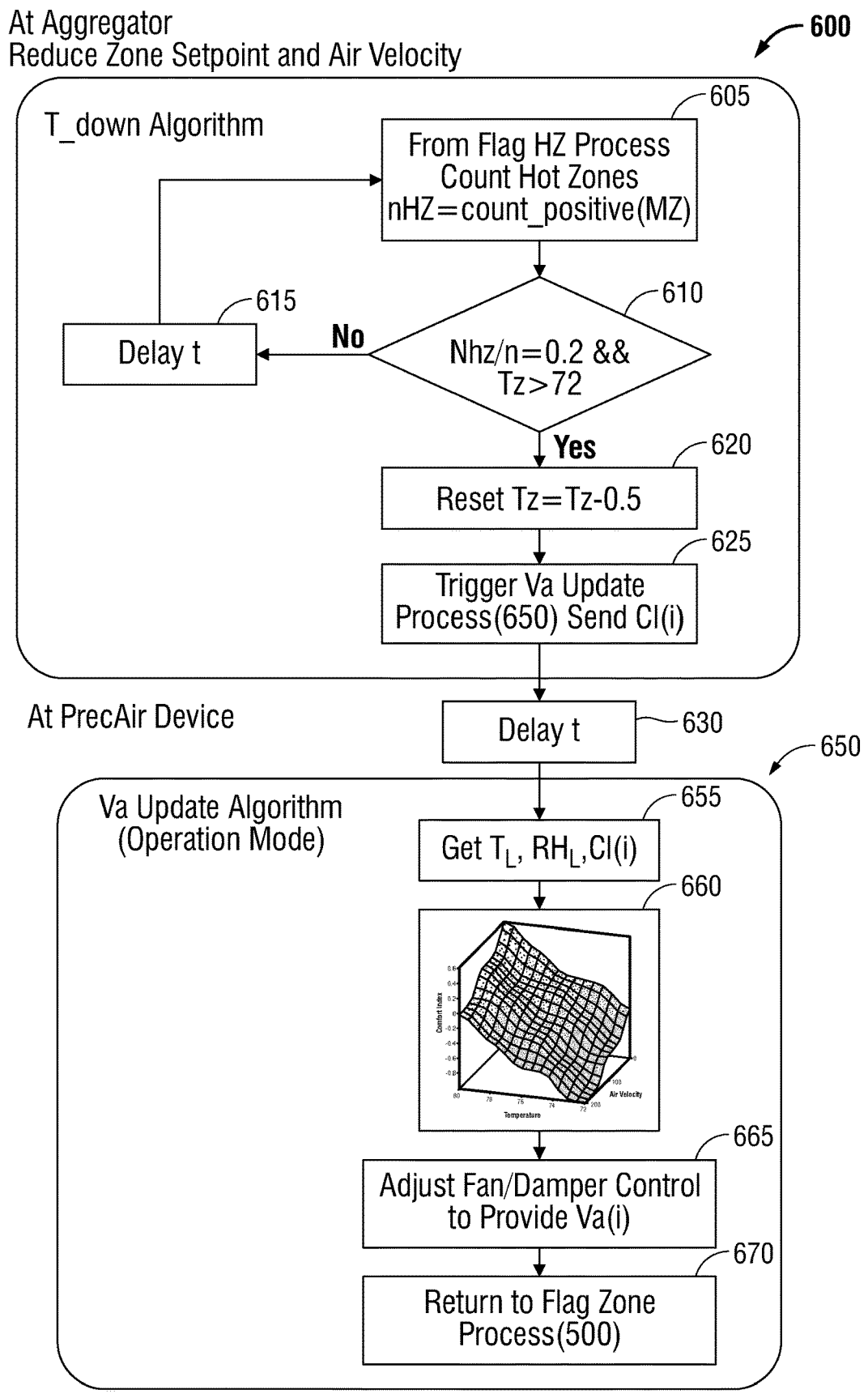
FIG. 21 is a flow diagram of a method of decreasing a zone setpoint of a microzone HVAC system in accordance with an embodiment of the present disclosure.

Zone setpoint decrease process 600 (T_down) and setpoint increase process (T_up) 700 are described with reference to FIGS. 21 and 22, respectively. The T_down process begins at block 605 by tabulating the total number of occupied microzones flagged as hot zones (FIG. 20, block 535). In block 610, a determination is made whether the percentage of hot microzones is at least a predetermined threshold percentage of the total number of occupied microzones within a VAV zone and whether zone temperature $T_Z$ exceeds a predetermined threshold temperature. In the present example embodiment, the predetermined threshold percentage is 20% and the predetermined threshold temperature is 72°, however, it should be understood that other threshold percentages and temperatures may be utilized to achieve system performance goals. Continuing with the present example, if the total number of hot microzones equals or exceeds 20% of the total number of occupied microzones and the zone temperature exceeds 72° F., then in block 620 the setpoint zone temperature is lowered by a preset increment, for example, 0.5° F. In block 625, the Va_update process (FIG. 21, block 650) is triggered to re-adjust the air velocity of precision air device 100. At block 630 a time delay is imposed to allow the system to stabilize.

Figure 22:
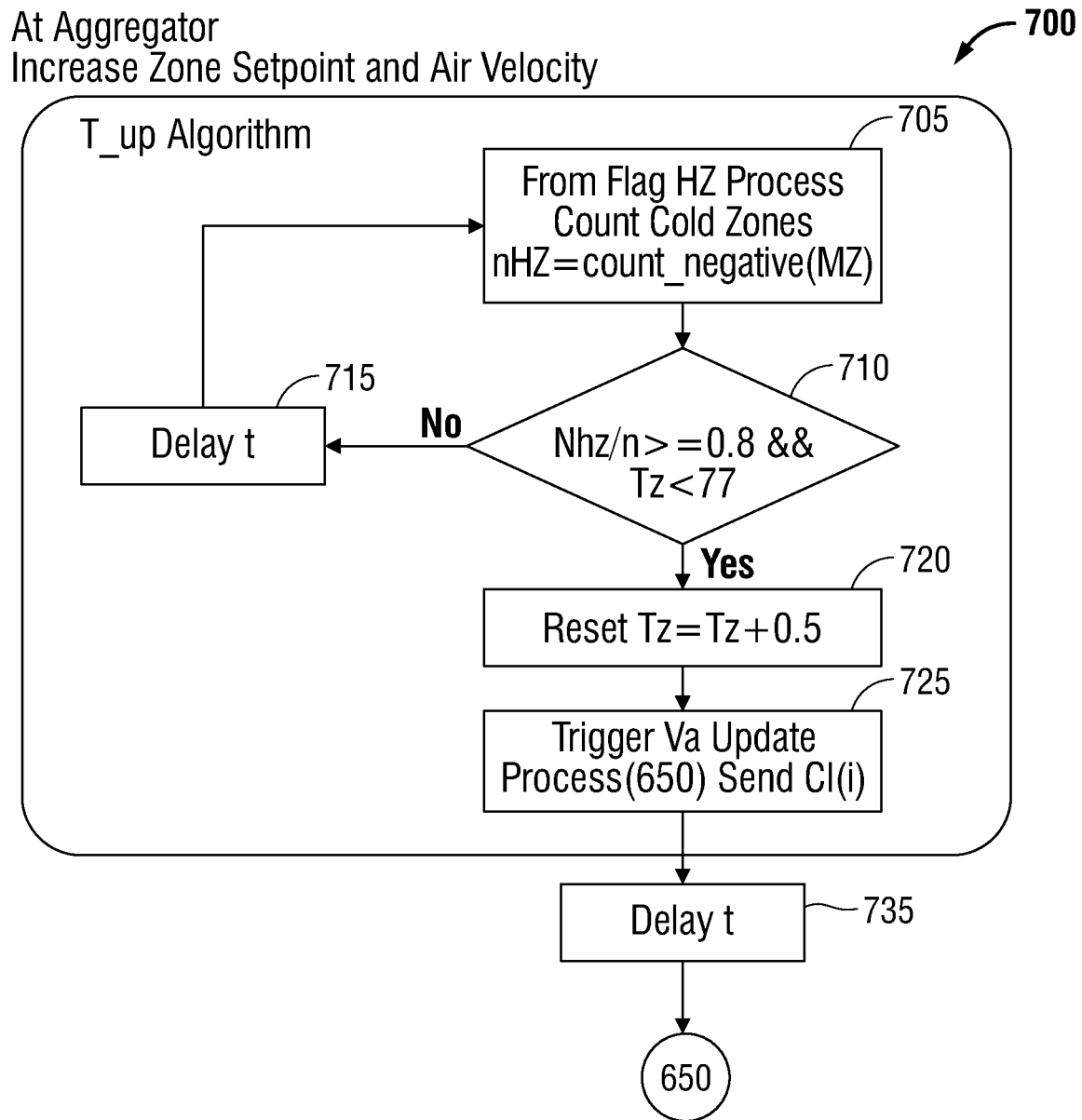
FIG. 22 is a flow diagram of a method of increasing a zone setpoint of a microzone HVAC system in accordance with an embodiment of the present disclosure.

In FIG. 22, the zone setpoint increase process (T_up) 700 begins at block 705 by tabulating the total number of microzones flagged as cold zones (FIG. 20, block 575). In block 710, a determination is made whether the percentage of cold microzones is at least a predetermined threshold percentage of the total number of occupied microzones within a VAV zone and whether zone temperature $T_Z$ is less that predetermined threshold temperature. In the present example embodiment, the predetermined threshold percentage is 80% and the predetermined threshold temperature is 77°, however, it should be understood that other threshold percentages and temperatures may be utilized to achieve system performance goals. Continuing with the present example, if the total number of cold microzones equals or exceeds 80% of the total number of occupied microzones and the zone temperature is less than 77° F., then in block 720 the setpoint zone temperature is increased by a preset increment, for example, 0.5° F. In block 725, the Va_update process (FIG. 21, block 650) is triggered to re-adjust the air velocity of precision air device 100. At block 730 a time delay is imposed to allow the system to stabilize.

With reference again to FIG. 21, the air velocity of precision air device 100 is adjusted by the Va_update process 650. At block 655, microzone temperature $T_L$, local relative humidity $RH_L$, and comfort index CI are obtained and in block 660 are applied to dynamic comfort index model 350 to obtain the appropriate air velocity Va required to satisfy the comfort requirements of the target microzone. In block 665, motor 100 speed (RPM) and nozzle damper 118 position XD are adjusted to generate air velocity Va, and at block 670 the microzone status continues to be re-evaluated (FIG. 20, block 500).

FIG. 23 illustrates a method 800 of updating a user's comfort index (CI) profile (FIG. 23, block 800). At block 805 the new comfort index CI is obtained. At block 810, a determination is made whether the new comfort index differs from the existing comfort index by more than a predetermined amount. In the present example, the comfort index must change by at least +/−2% from the existing comfort index. It should be noted, however, that in other embodiments, other percentages and/or absolute amounts may be utilized. If the change in comfort index does not exceed the predetermined amount, no update is performed and in block 815 the microzone status continues to be re-evaluated (FIG. 20, block 500). Otherwise, if the CI change equals or exceeds the predetermined amount, then in block 820, the current microzone CI is updated to reflect the new microzone CI and in block 825 the new user CI is stored for future reference. In block 830 a CI log update is initiated. In block 835, the new CI is entered into the microzone's short-term (daily) log 836 and long-term (yearly) log 837, and in block 840 the microzone status continues to be re-evaluated (FIG. 20, block 500).

Figure 24:
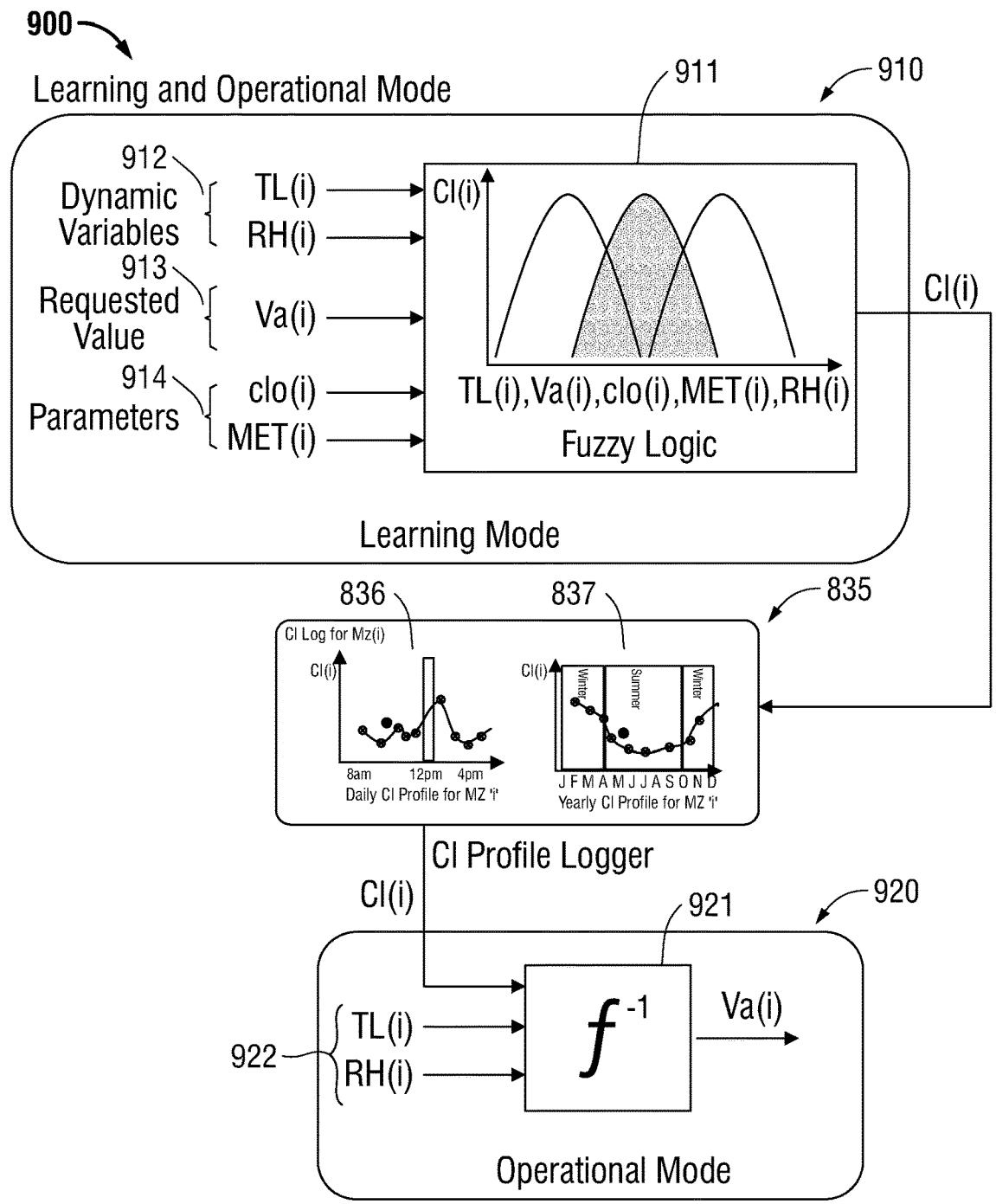
FIG. 24 is a flow diagram illustrating a learning and operating modes of a microzone HVAC system in accordance with an embodiment of the present disclosure.

FIG. 24 is a precision air data flow diagram 900 that illustrates a relationship between learning mode 910, short-term and long-term history (logs) 835, and operational mode 920 in accordance with an embodiment of the present disclosure. In learning mode 910, a fuzzy logic module 911 (or functional block implementing an alternative curve fitting methodology) receives input parameters including dynamic local microzone temperature $T_L$ and local relative humidity $RH_L$; a requested air velocity Va; and a user-specified clothing and metabolic parameters (CLO, MET). Fuzzy logic module 911 includes rules and weightings, such as those described above, to generate the comfort index CI for a given set of input parameters. The generated comfort index CI is stored into the microzone's (e.g., occupant's) short-term (daily) log 836 and long-term (yearly) log 837. During operational mode 920, the inverse function of the learning curves derived from fuzzy logic module 911 receives as input the local microzone temperature $T_L$, local relative humidity $RH_L$, and historically-adjusted microzone comfort index CI to generate the appropriate air velocity to achieve the appropriate perceived temperature $T_P$ for the given microzone. It should be understood that unlike prior art thermal comfort models which assume individual comfort is a fixed value, or a value within a range, the disclosed comfort index method recognizes that comfort preference not only changes from person to person, but also that a given person's comfort requirement can change during the day and throughout the year. In an embodiment, the short-term (daily) log 836 and long-term (yearly) log 837 are initialized with default curves for typical daily and seasonal variations. Daily log 836 and yearly log 837 curves are updated in accordance with the user requests for air velocity Va for a given local $T_L$, local relative humidity $RH_L$, and user-entered level of metabolic activity MET and clothing CLO.

Advantageously, the disclosed method effectively models radiant temperature, which is impractical to directly measure in an HVAC environment. Radiant temperature is a factor that affects and individual's instantaneous thermal comfort preference. The variation in radiant temperature with respect to seasons (dependent, for example, on outside ambient temperature) and week of the day (weekend/night setback temperature setpoints) is captured in the CI logger. A user's pattern in clothing preference throughout the year and changes in metabolic activity within a day are all captured in the CI logger. Once logged, these patterns will, over time, reduce user interaction with the system as it anticipates the user's clothing and metabolic activity patterns and provides the necessary adjustments in microzone climate to maintain the user's individual comfort.

Figure 25B:
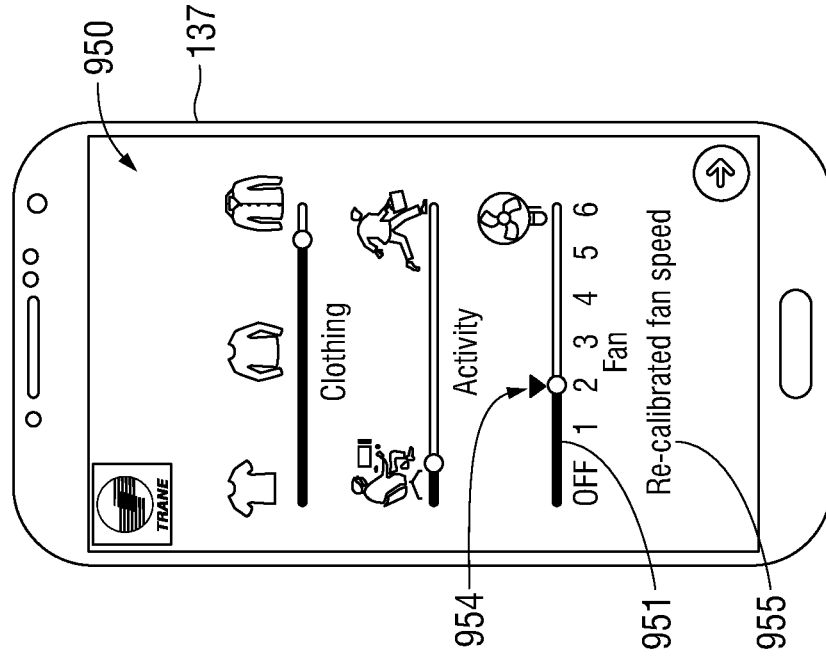
FIGS. 25A and 25B illustrate a user device user interface in accordance with another exemplary embodiment of the present disclosure.
Figure 25A:
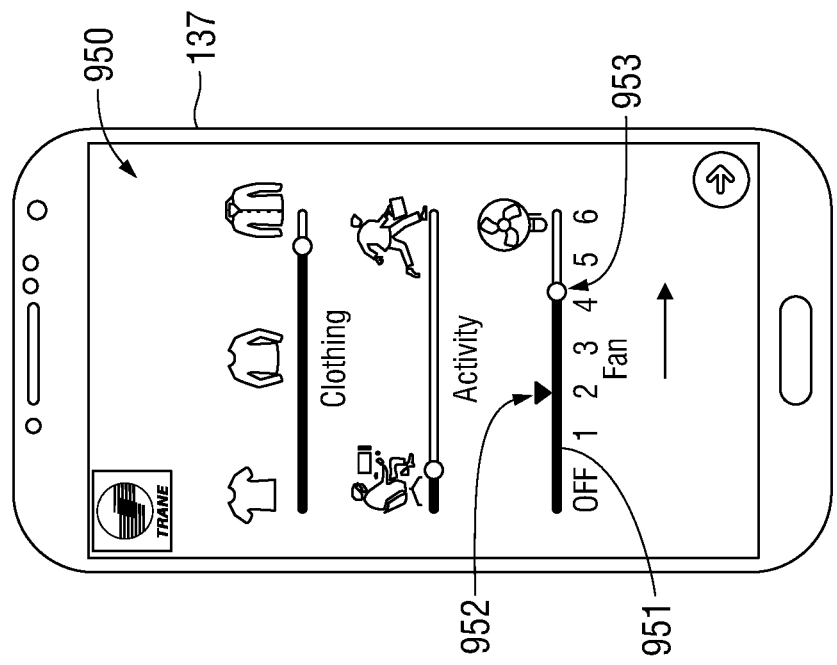

Examples of user interactions during learning mode 910 and operational mode 920 are illustrated in FIGS. 25A and 25B, wherein user device 137 includes a user interface 950 having a fan speed control 951 that enables a user to adjust the impeller speed of precision air device 100 between a minimum speed or off state to a maximum speed state. During use, the recommended (e.g., system-determined) fan speed is indicated by a fan speed indicator 952. If a user feels uncomfortable, for example, too warm, the user may request more air velocity (Va) by increasing the value of fan speed control 951 to the requested value 953. The request for increased air velocity triggers microzone learn mode 910 to update and log the user's comfort index as described above. In FIG. 25B, the microzone resumes operational mode, wherein fan speed indicator 952 is recalibrated to reflect the updated comfort index, and additionally or alternatively, a recalibration indicator 955 is presented on user interface 950.

ASPECTS

It is noted that any of aspects 1-22 may be combined with each other in any suitable combination.

Aspect 1. A precision air device comprising a housing, an air intake, an outlet nozzle, a nozzle damper operatively associated with the outlet nozzle, an air mover configured to move air from the air intake to the outlet nozzle, an air sensor, and a controller that comprises a processor in operative communication with the air mover and the air sensor, a communications interface coupled to the processor, and a memory coupled to the processor storing instructions, which, when executed by the processor, cause the controller to verify the presence of an occupant, determine a target air velocity, and adjust the nozzle damper and/or the air mover to deliver the determined air velocity from the outlet nozzle.

Aspect 2. The precision air device in accordance with any of aspect 1, further comprising an actuator coupled to the nozzle damper, the actuator in operative communication with the processor and configured to adjust the position of the nozzle damper.

Aspect 3. The precision air device in accordance with aspect 1 or 2, further comprising an occupancy sensor in operative communication with the processor.

Aspect 4. The precision air device in accordance with any of aspects 1-3, wherein the air sensor includes a temperature sensor and/or a relative humidity sensor.

Aspect 5. The precision air device in accordance with any of aspects 1-4, wherein the air mover comprises a centrifugal impeller and a variable speed motor operatively coupled to the centrifugal impeller.

Aspect 6. The precision air device in accordance with any of aspects 1-5, wherein the air mover is fixed to the base with one or more isolation members.

Aspect 7. The precision air device in accordance with any of aspects 1-6, further comprising a vane structure disposed between the air intake and the air mover and having a series of vanes extending downwardly therefrom dimensioned to engage an inner surface of the housing and configured to direct air from the air mover to the outlet nozzle.

Aspect 8. A microzone HVAC system, comprising a variable air volume box configured to deliver conditioned air to a zone, one or more precision air devices, and a precision air aggregator in operative communication with the one or more precision air devices and the variable air volume box.

Aspect 9. The microzone HVAC system in accordance with aspect 8, further comprising application software configured for execution on a user device to enable a user to communicate a comfort parameter to the microzone HVAC system.

Aspect 10. The microzone HVAC system in accordance with aspect 8 or 9, wherein the application software is further configured to pair the user device to a specific one of the one or more precision air devices.

Aspect 11. The microzone HVAC system in accordance with any of aspects 8-10, wherein the comfort parameter is selected from the group consisting of a fan speed, a clothing characterization, and a metabolic characterization.

Aspect 12. The microzone HVAC system in accordance with any of aspects 8-11, wherein the precision air aggregator is communicatively coupled with the one or more precision air devices by a wireless mesh network.

Aspect 13. The microzone HVAC system in accordance with any of aspects 8-12, wherein the precision air device comprises a housing, an air intake, an outlet nozzle, a nozzle damper operatively associated with the outlet nozzle, an air mover configured to move air from the air intake to the outlet nozzle, an air sensor, and a controller comprising a processor in operative communication with the air mover and air sensor, a communications interface coupled to the processor, and a memory coupled to the processor storing instructions, which, when executed by the processor, cause the controller to verify the presence of an occupant, determine a target air velocity, and adjust the nozzle damper and/or the air mover to deliver the determined air velocity from the outlet nozzle.

Aspect 14. The microzone HVAC system in accordance with any of aspects 8-13, wherein the precision air aggregator comprises a comfort index log, a processor, a communications interface coupled to the processor, and a memory coupled to the processor storing instructions, which, when executed by the processor, cause the controller to receive a comfort index from a precision air device and enter the received comfort index into the a comfort index log if the received comfort index differs from the previous comfort index by a predetermined amount.

Aspect 15. A method of operating a microzone HVAC system, comprising associating a precision air device to a microzone within a climate control macrozone, pairing a user device with the precision air device, cooling the macrozone to a first setpoint temperature, sensing an occupancy of the microzone, receiving, at the precision air device, a user comfort parameter from the user device, and adjusting an air velocity of the precision air device in accordance with the received user comfort parameter to attempt to achieve a perceived temperature at the microzone that is different from the first setpoint temperature.

Aspect 16. The method of operating a microzone HVAC system in accordance with aspect 15, further comprising cooling the macrozone to a second setpoint temperature that is different than the first setpoint temperature if the perceived temperature is not achieved.

Aspect 17. The method of operating a microzone HVAC system in accordance with aspect 15 or 16, further comprising defining an initial comfort index of a user, obtaining a macrozone temperature, a microzone temperature, a current air velocity of the precision air device, a user clothing characterization, and a user metabolic characterization, receiving an air velocity adjustment amount from the user, and updating the comfort index of the user based on the air velocity adjustment.

Aspect 18. The method of operating a microzone HVAC system in accordance with any of aspects 15-17, wherein the macrozones include a plurality of microzones, further comprising cooling the macrozone to a second setpoint temperature that is lower than the first setpoint temperature if the number of microzones where the current air velocity is greater than a predetermined threshold exceeds a predetermined percentage of the total number of microzones.

Aspect 19. The method of operating a microzone HVAC system in accordance with any of aspects 15-18, wherein the macrozones include a plurality of microzones, further comprising cooling the macrozone to a second setpoint temperature that is lower than the first setpoint temperature if the number of microzones where the current air velocity is greater than a predetermined threshold exceeds a predetermined percentage of the total number of occupied microzones.

Aspect 20. The method of operating a microzone HVAC system in accordance with any of aspects 15-19, further comprising soliciting an updated user clothing characterization and an updated user metabolic characterization if the microzone temperature exceeds the macrozone temperature.

Aspect 21. The method of operating a microzone HVAC system in accordance with any of aspects 15-20, wherein the macrozones include a plurality of microzones, further comprising increasing the macrozone temperature to a second setpoint temperature that is greater than the first setpoint temperature if the number of microzones where the current air velocity is less than a predetermined threshold exceeds a predetermined percentage of the total number of microzones.

Aspect 22. The method of operating a microzone HVAC system in accordance with any of aspects 15-21, wherein the macrozones include a plurality of microzones, further comprising increasing the macrozone temperature to a second setpoint temperature that is greater than the first setpoint temperature if the number of microzones where the current air velocity is less than a predetermined threshold exceeds a predetermined percentage of the total number of occupied microzones.

What is claimed is:

1. A method of operating a microzone HVAC system, comprising:

associating, by a device comprising a processor, a precision air device to a microzone that is determined to represent a portion, of a macrozone, served by the precision air device, wherein an ambient condition of the macrozone is controlled according to a first temperature setpoint;

in response to a determination that an ambient condition of the microzone does not satisfy a user comfort parameter, determining, by the device, a velocity at which air is to be discharged from an outlet of the precision air device that will satisfy the user comfort parameter;

controlling, by the device, an air mover of the precision air device to discharge air at the velocity; and in response to determining that the velocity is above a defined threshold, cooling the macrozone to a second temperature that is lower than the first temperature setpoint.

2. The method of operating a microzone HVAC system in accordance with claim 1, further comprising in response to determining that the user comfort setting is not satisfied within the microzone, adjusting the first temperature setpoint to a second temperature setpoint that is different than the first temperature setpoint.

3. The method of operating a microzone HVAC system in accordance with claim 1, further comprising:

defining an initial comfort index of a user;

obtaining a macrozone temperature, a microzone temperature, a current air velocity of the precision air device, a user clothing characterization, and a user metabolic characterization;

receiving an air velocity adjustment amount from the user; and updating the comfort index of the user based on the air velocity adjustment.

4. The method of operating a microzone HVAC system in accordance with claim 1, wherein the macrozone comprises a plurality of microzones served by a plurality of precision air devices operating according to respective velocities, further comprising, in response to determining that a defined percentage of the respective velocities is greater than a defined threshold, cooling the macrozone to a second temperature that is lower than the first temperature setpoint.

5. The method of operating a microzone HVAC system in accordance with claim 1, further comprising, in response to determining that a microzone temperature exceeds a macrozone temperature, soliciting an updated user clothing characterization and an updated user metabolic characterization.

6. The method of operating a microzone HVAC system in accordance with claim 1, wherein the ambient condition of the macrozone that is controlled according to the first temperature setpoint is satisfied by discharging conditioned air from a duct into a non-ducted space of the macrozone, and wherein the precision air device comprises an intake that receives air from the non-ducted space of the macrozone.

7. The method of operating a microzone HVAC system in accordance with claim 1, wherein the user comfort parameter is selected from the group consisting of an air mover speed of the precision air device, a clothing characterization, and a metabolic characterization.

8. A method of operating a microzone HVAC system, comprising:

associating, by a device comprising a processor, a precision air device to a microzone that is determined to represent a portion, of a macrozone, served by the precision air device, wherein an ambient condition of the macrozone is controlled according to a first temperature setpoint;

in response to a determination that an ambient condition of the microzone does not satisfy a user comfort parameter, determining, by the device, a velocity at which air is to be discharged from an outlet of the precision air device that will satisfy the user comfort parameter;

controlling, by the device, an air mover of the precision air device to discharge air at the velocity; and in response to determining that the velocity is below a defined threshold, heating the macrozone to a second temperature that is higher than the first temperature setpoint.

9. The method of operating a microzone HVAC system in accordance with claim 8, further comprising in response to determining that the user comfort setting is not satisfied within the microzone, adjusting the first setpoint to a second setpoint that is different than the first setpoint.

10. The method of operating a microzone HVAC system in accordance with claim 8, further comprising:

defining an initial comfort index of a user;

obtaining a macrozone temperature, a microzone temperature, a current air velocity of the precision air device, a user clothing characterization, and a user metabolic characterization;

receiving an air velocity adjustment amount from the user; and updating the comfort index of the user based on the air velocity adjustment.

11. The method of operating a microzone HVAC system in accordance with claim 8, further comprising, in response to determining that a microzone temperature exceeds a macrozone temperature, soliciting an updated user clothing characterization and an updated user metabolic characterization.

12. The method of operating a microzone HVAC system in accordance with claim 8, wherein the macrozone comprises a plurality of microzones served by a plurality of precision air devices operating according to respective velocities, further comprising, in response to determining that a defined percentage of the respective velocities is less than a defined threshold, heating the macrozone to a second temperature that is higher than the first temperature setpoint.

13. The method of operating a microzone HVAC system in accordance with claim 8, wherein the ambient condition of the macrozone that is controlled according to the first temperature setpoint is satisfied by discharging conditioned air from a duct into a non-ducted space of the macrozone, and wherein the precision air device comprises an intake that receives air from the non-ducted space of the macrozone.

14. The method of operating a microzone HVAC system in accordance with claim 8, wherein the user comfort parameter is selected from the group consisting of an air mover speed of the precision air device, a clothing characterization, and a metabolic characterization.

15. A method of operating a microzone HVAC system, comprising:

associating, by a device comprising a processor, a precision air device to a microzone that is determined to represent a portion, of a macrozone, served by the precision air device, wherein an ambient condition of the macrozone is controlled according to a first temperature setpoint;

in response to a determination that an ambient condition of the microzone does not satisfy a user comfort parameter, determining, by the device, a velocity at which air is to be discharged from an outlet of the precision air device that will satisfy the user comfort parameter;

controlling, by the device, an air mover of the precision air device to discharge air at the velocity;

defining an initial comfort index of a user;

obtaining a macrozone temperature, a microzone temperature, a current air velocity of the precision air device, a user clothing characterization, and a user metabolic characterization;

receiving an air velocity adjustment amount from the user; and updating the comfort index of the user based on the air velocity adjustment.

16. The method of operating a microzone HVAC system in accordance with claim 15, further comprising entering the updated comfort index into a comfort index log if the updated comfort index differs from the previous comfort index by more than a predetermined amount.

17. The method of operating a microzone HVAC system in accordance with claim 16, further comprising adjusting an ambient condition of the microzone based upon short term and/or long term patterns observed in the comfort index log.

18. The method of operating a microzone HVAC system in accordance with claim 15, further comprising in response to determining that the user comfort setting is not satisfied within the microzone, adjusting the first setpoint to a second setpoint that is different than the first setpoint.

19. The method of operating a microzone HVAC system in accordance with claim 15, further comprising, in response to determining that a microzone temperature exceeds a macrozone temperature, soliciting an updated user clothing characterization and an updated user metabolic characterization.

20. The method of operating a microzone HVAC system in accordance with claim 15, wherein the ambient condition of the macrozone that is controlled according to the first setpoint is satisfied by discharging conditioned air from a duct into a non-ducted space of the macrozone, and wherein the precision air device comprises an intake that receives air from the non-ducted space of the macrozone.

21. The method of operating a microzone HVAC system in accordance with claim 15, wherein the user comfort parameter is selected from the group consisting of an air mover speed of the precision air device, a clothing characterization, and a metabolic characterization.

* * * * *